US012706475B2

(12) United States Patent
Chen et al.

(10) Patent No.: US 12,706,475 B2
(45) Date of Patent: Aug. 11, 2026

(54) THREE-WIRE DC-DC CONVERTER AND PARALLEL POWER SUPPLY SYSTEM

(71) Applicant: Huawei Digital Power Technologies Co., Ltd., Shenzhen (CN)

(72) Inventors: Baoguo Chen, Dongguan (CN); Dazhi Wang, Dongguan (CN); Pengpeng Yu, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 468 days.

(21) Appl. No.: 18/161,884

(22) Filed: Jan. 30, 2023

(65) Prior Publication Data

US 2023/0170793 A1 Jun. 1, 2023

Related U.S. Application Data

(63) Continuation of application No. PCT/CN2021/099068, filed on Jun. 9, 2021.

(30) Foreign Application Priority Data

Jul. 31, 2020 (CN) ........................ 202010760557.0

(51) Int. Cl.
*H02J 9/06* (2006.01)
*H02J 1/102* (2026.01)

(52) U.S. Cl.
CPC .............. *H02J 9/061* (2013.01); *H02J 1/102* (2013.01)

(58) Field of Classification Search
CPC .. H02J 9/061; H02J 1/102; H02J 9/06; H02M 1/0009; H02M 3/003; H02M 1/0067; H02M 1/008; H02M 3/1584; H02M 3/156; H02M 1/32
USPC ........................................................... 307/43
See application file for complete search history.

(56) References Cited

U.S. PATENT DOCUMENTS 5,768,117 A * 6/1998 Takahashi .............. H02J 1/102 363/78
10,476,385 B2 * 11/2019 Koniakowsky ......... H02M 1/08
2005/0213353 A1 * 9/2005 Lys ...................... H02M 1/425 363/17
2006/0132102 A1 6/2006 Harvey
(Continued)

FOREIGN PATENT DOCUMENTS

CN 103490613 A 1/2014
CN 103490614 A 1/2014
(Continued)

*Primary Examiner* — Richard Tan

(57) ABSTRACT

This application discloses a three-wire DC-DC converter and a parallel power supply system. The parallel power supply system includes a common wiring busbar, an input wiring busbar, an output wiring busbar, and at least two three-wire DC-DC converters. Each three-wire DC-DC converter includes a DC-DC conversion circuit, an input wiring terminal, an output wiring terminal, and a common wiring terminal. Input wiring terminals of all the three-wire DC-DC converters are connected in parallel to the input wiring busbar, output wiring terminals of all the three-wire DC-DC converters are connected in parallel to the output wiring busbar, and the common wiring terminals of all the three-wire DC-DC converters are connected in parallel to the common wiring busbar. The wiring busbar is configured to connect a first direct current power supply and a load.

16 Claims, 12 Drawing Sheets

(56) References Cited

U.S. PATENT DOCUMENTS

| | | | |
|---|---|---|---|
| 2008/0037305 | A1 | 2/2008 | West |
| 2011/0188273 | A1 | 8/2011 | Pansier et al. |
| 2014/0062446 | A1 | 3/2014 | Ikriannikov |
| 2015/0210232 | A1 | 7/2015 | Kanzaki et al. |

FOREIGN PATENT DOCUMENTS

| | | | | |
|---|---|---|---|---|
| CN | 104065281 | A | | 9/2014 |
| CN | 104485728 | | * | 4/2015 |
| CN | 205430059 | U | | 8/2016 |
| CN | 109120152 | | * | 1/2019 |
| CN | 109120152 | A | | 1/2019 |
| CN | 208386419 | U | | 1/2019 |
| CN | 208924117 | U | | 5/2019 |
| CN | 209170226 | | * | 7/2019 |
| CN | 110752657 | A | | 2/2020 |
| CN | 111064359 | A | | 4/2020 |
| CN | 111817343 | | * | 10/2020 |
| JP | 2012044801 | A | | 3/2012 |
| KR | 101449230 | B1 | | 10/2014 |
| WO | 2020068969 | A1 | | 4/2020 |

* cited by examiner

THREE-WIRE DC-DC CONVERTER AND PARALLEL POWER SUPPLY SYSTEM

CROSS-REFERENCE TO RELATED APPLICATIONS

This application is a continuation of International Application No. PCT/CN2021/099068, filed on Jun. 9, 2021, which claims priority to Chinese Patent Application No. 202010760557.0, filed on Jul. 31, 2020. The disclosures of the aforementioned applications are hereby incorporated by reference in their entireties.

TECHNICAL FIELD

This application relates to the field of electric equipment technologies, and in particular, to a three-wire DC-DC converter and a parallel power supply system.

BACKGROUND

A direct current direct current (DC-DC) power system is configured to convert a voltage level. The DC-DC power system converts an input first voltage into a second voltage and outputs the second voltage.

FIG. 1 is a schematic diagram of a DC-DC power system. The DC-DC power system includes a direct current power supply 110, a parallel power supply system 120, and a direct current load 130. The parallel power supply system 120 includes n four-wire DC-DC converters, input terminals of the n four-wire DC-DC converters are connected in parallel to the direct current power supply 110, output terminals of the n four-wire DC-DC converters are connected in parallel to the direct current load 130, and n is an integer greater than 1. The DC-DC converter in the parallel power supply system 120 converts a voltage output by the direct current power supply 110 into a voltage required by the direct current load 130.

When the parallel power supply system 120 uses the four-wire DC-DC converter shown in FIG. 1, return currents flowing from a second power terminal (D) of the direct current load 130 fully flow back to the direct current power supply 110 through all the four-wire DC-DC converters. However, because the parallel power supply system 120 cannot control a magnitude of the return current passing through each four-wire DC-DC converter, a large part of the return current may flow back to the direct current power supply 110 through one four-wire DC-DC converter, and the current exceeds a current that the four-wire DC-DC converter can withstand, or in other words, an overcurrent occurs. In this case, the four-wire DC-DC converter may be burnt.

SUMMARY

To resolve the foregoing technical problem, this application provides a three-wire DC-DC converter and a parallel power supply system, to control a return current to evenly pass through each DC-DC converter, thereby preventing the DC-DC converter from being burnt.

According to a first aspect, this application provides a parallel power supply system, including a common wiring busbar, an input wiring busbar, an output wiring busbar, and at least two three-wire DC-DC converters. The parallel power supply system uses a three-wire DC-DC converter instead of a four-wire DC-DC converter. Each three-wire DC-DC converter includes a DC-DC conversion circuit, an input wiring terminal, an output wiring terminal, and a common wiring terminal. Input wiring terminals of all the three-wire DC-DC converters are connected in parallel to the input wiring busbar, output wiring terminals of all the three-wire DC-DC converters are connected in parallel to the output wiring busbar, and common wiring terminals of all the three-wire DC-DC converters are connected in parallel to the common wiring busbar. The parallel power supply system controls output voltages of all the three-wire DC-DC converters, and adjusts currents at the output wiring terminals of all the three-wire DC-DC converters to be consistent. Because the output wiring terminals of all the three-wire DC-DC converters are connected in parallel, output voltages of all the three-wire DC-DC converters are equal. In addition, it is known that power is equal to a product of a voltage and a current. Therefore, output power of all the three-wire DC-DC converters is equal. Moreover, because efficiency of all the three-wire DC-DC converters is equal, input power of all the three-wire DC-DC converters is equal. Because the input wiring terminals of all the three-wire DC-DC converters are connected in parallel, input voltages of all the three-wire DC-DC converters are equal. In addition, it is known that power is equal to a product of a voltage and a current. Therefore, input currents of all the three-wire DC-DC converters are also equal. According to Kirchhoff's law, a current at a common wiring terminal of a three-wire DC-DC converter is a difference between an input current at an input wiring terminal and an output current at an output wiring terminal. In addition, the output currents at the output wiring terminals are all equal, and the input currents at the input wiring terminals are all equal. Therefore, currents at the common wiring terminals of all the three-wire DC-DC converters are also equal.

Thus, the parallel power supply system controls the output currents at the output wiring terminals of all the three-wire DC-DC converters, so that the output currents at the output wiring terminals of all the three-wire DC-DC converters are consistent. This avoids a case in which a DC-DC converter is damaged due to an excessively large return current of the DC-DC converter.

Optionally, the parallel power supply system controls, by using a controller, the output currents at the output wiring terminals of all the three-wire DC-DC converters to be consistent. The parallel power supply system further includes a controller, the at least two three-wire DC-DC converters include a first three-wire DC-DC converter and a second three-wire DC-DC converter, and the parallel power supply system further includes a first current detection circuit and a second current detection circuit. The first current detection circuit is configured to detect a first current at an output wiring terminal of the first three-wire DC-DC converter, and transmit the first current to the controller. The second current detection circuit is configured to detect a second current at an output wiring terminal of the second three-wire DC-DC converter, and transmit the second current to the controller. The controller is configured to control an output voltage of the first three-wire DC-DC converter to enable the first current to be consistent with a preset current, and control an output voltage of the second three-wire DC-DC converter to enable the second current to be consistent with the preset current. The controller controls the output voltages of all the three-wire DC-DC converters in the parallel power supply system, and adjusts the currents at the output wiring terminals of all the three-wire DC-DC converters to be consistent with the preset current, so that the currents at the common wiring terminals of all the three-wire DC-DC converters are consistent, the currents at the input wiring terminals of all the three-wire DC-DC converters are consistent, and the currents at the common wiring terminals of all the DC-DC converters are consistent, thereby implementing real current equalization control of all the three-wire DC-DC converters.

Optionally, the parallel power supply system provided in this application can enable two or more DC-DC power systems to be paralleled. The following uses two power supplies as an example, which are respectively a first direct current power supply and a second direct current power supply. Voltages of the first direct current power supply and the second direct current power supply are different. The output wiring busbar is connected to a first power input terminal of the second direct current power supply, and the first power input terminal of the second direct current power supply is connected to a load. The common wiring busbar is connected to a second power input terminal of the first direct current power supply, and the common wiring busbar is connected to a second power input terminal of the second direct current power supply. Each of the three-wire DC-DC converters is configured to convert a voltage at the first power input terminal of the first direct current power supply to be consistent with a voltage at the first power input terminal of the second direct current power supply. The output voltage of the first direct current power supply is converted to be consistent with the output voltage of the second direct current power supply, thereby supplying power to a load of the second direct current power supply. The parallel power supply system controls the output currents at the output wiring terminals of all the three-wire DC-DC converters, to enable the output current at the output wiring terminal of each three-wire DC-DC converter to be consistent with the preset current, so that the currents at the common wiring terminals of all the three-wire DC-DC converters are consistent; in other words, the current equalization control of all the three-wire DC-DC converters is implemented. This avoids a case in which a DC-DC converter is damaged due to an excessively large return current of the DC-DC converter.

Optionally, when the first direct current power supply and the second direct current power supply cooperatively work, a power supply manner may be set to preferential power supply and backup power supply. When the preferential power supply is implemented, the controller is configured to control all the three-wire DC-DC converters to transmit all remaining electric energy of the first direct current power supply to the load after conversion. When the backup power supply is implemented, the controller is configured to: when the second direct current power supply is insufficient to meet an electric energy requirement of the load, control all the three-wire DC-DC converters to transmit remaining electric energy of the first direct current power supply to the load after conversion.

Optionally, a manner in which the controller controls all the three-wire DC-DC converters may be that an output current of the output wiring busbar is consistent with an output current of the second direct current power supply.

Optionally, the DC-DC conversion circuit is at least one of the following types: an H-bridge circuit, a Buck circuit, a Boost circuit, a BuckBoost circuit, a Cuk circuit, a Sepic circuit, and a Zeta circuit. In other words, the DC-DC conversion circuit may be any one of the foregoing seven types of circuits, or may be a topology structure of a combination or variants of at least two of the foregoing seven types of circuits. The following separately describes the topology structures of the foregoing seven types of circuits.

First type: When the DC-DC conversion circuit is an H-bridge circuit, the DC-DC conversion circuit includes a first switching transistor, a second switching transistor, a third switching transistor, a fourth switching transistor, an inductor, a first capacitor, and a second capacitor. A first terminal of the first switching transistor is connected to the input wiring terminal, a second terminal of the first switching transistor is connected to a first terminal of the second switching transistor, and a second terminal of the second switching transistor is connected to the common wiring terminal. A first terminal of the third switching transistor is connected to the output wiring terminal, a second terminal of the third switching transistor is connected to a first terminal of the fourth switching transistor, and a second terminal of the fourth switching transistor is connected to the common wiring terminal. The first capacitor is connected between the input wiring terminal and the common wiring terminal, the second capacitor is connected between the common wiring terminal and the output wiring terminal, and the inductor is connected between the second terminal of the first switching transistor and the second terminal of the third switching transistor.

Second type: When the DC-DC conversion circuit is a Buck circuit, the DC-DC conversion circuit includes a switching transistor, a diode, an inductor, and a capacitor. A first terminal of the switching transistor is connected to the input wiring terminal, a second terminal of the switching transistor is connected to the output wiring terminal through the inductor, the second terminal of the switching transistor is connected to a cathode of the diode, an anode of the diode is connected to the common wiring terminal, and the capacitor is connected between the output wiring terminal and the common wiring terminal.

Third type: When the DC-DC conversion circuit is a Boost circuit, the DC-DC conversion circuit includes a switching transistor, a diode, an inductor, and a capacitor. A first terminal of the inductor is connected to the input wiring terminal, a second terminal of the inductor is connected to the common wiring terminal through the switching transistor, the second terminal of the inductor is connected to an anode of the diode, a cathode of the diode is connected to the output wiring terminal, and the capacitor is connected between the output wiring terminal and the common wiring terminal.

Fourth type: When the DC-DC conversion circuit is a BuckBoost circuit, the DC-DC conversion circuit includes a switching transistor, a diode, an inductor, and a capacitor. A first terminal of the switching transistor is connected to the input wiring terminal, a second terminal of the switching transistor is connected to the common wiring terminal through the inductor, the second terminal of the switching transistor is connected to a cathode of the diode, an anode of the diode is connected to the output wiring terminal, and the capacitor is connected between the output wiring terminal and the common wiring terminal.

Fifth type: When the DC-DC conversion circuit is a Cuk circuit, the DC-DC conversion circuit includes a first inductor, a second inductor, a first capacitor, a second capacitor, a switching transistor, and a diode. A first terminal of the first inductor is connected to the input wiring terminal, a second terminal of the first inductor is connected to the common wiring terminal through the switching transistor, the second terminal of the first inductor is connected to a first terminal of the first capacitor, a second terminal of the first capacitor is connected to the output wiring terminal through the second inductor, the second terminal of the first capacitor is connected to an anode of the diode, a cathode of the diode is connected to the common wiring terminal, and the second capacitor is connected between the output wiring terminal and the common wiring terminal.

Sixth type: When the DC-DC conversion circuit is a Sepic circuit, the DC-DC conversion circuit includes a first inductor, a second inductor, a first capacitor, a second capacitor, a switching transistor, and a diode. A first terminal of the first inductor is connected to the input wiring terminal, a second terminal of the first inductor is connected to the common wiring terminal through the switching transistor, the second terminal of the first inductor is connected to a first terminal of the first capacitor, a second terminal of the first capacitor is connected to the common wiring terminal through the second inductor, the second terminal of the first capacitor is connected to an anode of the diode, a cathode of the diode is connected to the output wiring terminal, and the second capacitor is connected between the output wiring terminal and the common wiring terminal.

Seventh type: When the DC-DC conversion circuit is a Zeta circuit, the DC-DC conversion circuit includes a first inductor, a second inductor, a first capacitor, a second capacitor, a switching transistor, and a diode. A first terminal of the switching transistor is connected to the input wiring terminal, a second terminal of the switching transistor is connected to the common wiring terminal through the first inductor, the second terminal of the switching transistor is connected to a first terminal of the first capacitor, a second terminal of the first capacitor is connected to the output wiring terminal through the second inductor, the second terminal of the first capacitor is connected to a cathode of the diode, an anode of the diode is connected to the common wiring terminal, and the second capacitor is connected between the output wiring terminal and the common wiring terminal.

Optionally, the parallel power supply system provided in this application may be further applied to a communication base station. The first direct current power supply is negative 53.5 volts, and the voltage of the second direct current power supply is negative 57 volts. When a new DC-DC power system cannot be expanded, the DC-DC power system on a live network of the communication base station may be paralleled with the new DC-DC power system to supply power to a load in the new DC-DC power system. The voltage output by the DC-DC power system on the live network of the base station is converted from negative 53.5 volts to negative 57 volts to supply power to the load in the new DC-DC power system, thereby meeting a requirement of the load.

Optionally, a power flow of the three-wire DC-DC converter in the parallel power supply system cannot only flow unidirectionally but also flow bidirectionally. In other words, a voltage input by the input wiring busbar is converted into another voltage and the another voltage is output, and a voltage input by the output wiring busbar is converted into another voltage and the another voltage is output. All the three-wire DC-DC converters are further configured to convert a first voltage input by the output wiring busbar into a second voltage and output the second voltage; and the input wiring busbar is configured to connect to a first terminal of a bidirectional isolated DC-DC converter, and a second terminal of the bidirectional isolated DC-DC converter is configured to connect to a battery. The three-wire DC-DC converter can supply power to the load after being connected in series with the battery, and the output wiring busbar can charge the battery through the three-wire DC-DC converter, to implement bidirectional power supply of the parallel power supply system. Therefore, the three-wire DC-DC converter processes only a part of power of the entire system. Compared with an architecture in which the three-wire DC-DC converter processes all power of the parallel power supply system, the three-wire DC-DC converter provided in this embodiment of this application features higher efficiency, a smaller size, and lower costs.

According to a second aspect, this application provides another parallel power supply system, which is applied to a scenario in which a plurality of batteries of different levels supply power to a same load, for example, a scenario of a lead-acid battery pack. By using one three-wire DC-DC converter or cascading a plurality of three-wire DC-DC converters, voltages output by the batteries of different voltage levels are separately converted into a voltage required by the load, thereby implementing power expansion of the batteries of different levels. At least the following two three-wire DC-DC converters are included: a first three-wire DC-DC converter and a second three-wire DC-DC converter. Each three-wire DC-DC converter includes a DC-DC conversion circuit, an input wiring terminal, an output wiring terminal, and a common wiring terminal. The input wiring terminal of the first three-wire DC-DC converter is connected to a first battery, and the input wiring terminal of the second three-wire DC-DC converter is connected to a second battery. The common wiring terminal of the first three-wire DC-DC converter is connected to the first battery, and the common wiring terminal of the second three-wire DC-DC converter is connected to the second battery. The common wiring terminal of the first three-wire DC-DC converter and the common wiring terminal of the second three-wire DC-DC converter are both connected to the load. The output wiring terminal of the first three-wire DC-DC converter and the output wiring terminal of the second three-wire DC-DC converter are both connected to the load.

According to a third aspect, this application provides still another parallel power supply system, which is applied to a scenario in which different loads have different requirements on power supply voltage standards. A parallel power supply system that includes at least two three-wire DC-DC converters separately converts a same power supply busbar into different voltage standards, to meet different requirements of different loads on power supply voltage standards. At least the following two three-wire DC-DC converters are included: a first three-wire DC-DC converter and a second three-wire DC-DC converter. Each three-wire DC-DC converter includes a DC-DC conversion circuit, an input wiring terminal, an output wiring terminal, and a common wiring terminal. The input wiring terminal of the first three-wire DC-DC converter and the input wiring terminal of the second three-wire DC-DC converter are both connected to a power supply busbar of a direct current power supply. The common wiring terminal of the first three-wire DC-DC converter and the common wiring terminal of the second three-wire DC-DC converter are both connected to the power supply busbar. The common wiring terminal of the first three-wire DC-DC converter is connected to a first load, and the common wiring terminal of the second three-wire DC-DC converter is connected to a second load. The output wiring terminal of the first three-wire DC-DC converter is connected to the first load, and the output wiring terminal of the second three-wire DC-DC converter is connected to the second load.

According to a fourth aspect, this application provides a three-wire DC-DC converter, where a three-wire topology structure is used instead of a four-wire topology structure. The three-wire DC-DC converter includes three wiring terminals, which are respectively an input wiring terminal, an output wiring terminal, and a common wiring terminal. The input wiring terminal is connected to a first power input terminal of a direct current power supply, the output wiring terminal is connected to a first power terminal of a direct current load, the common wiring terminal is connected to a second power terminal of the direct current load, and the second power terminal of the direct current load is connected to a second power input terminal of the direct current power supply. Therefore, compared with a four-wire DC-DC converter, the three-wire DC-DC converter reduces one wire, and changes a quantity of wiring terminals from four to three. Therefore, the three-wire DC-DC converter provided in this application may reduce a quantity of wires and a quantity of wiring terminals, and reduce wiring complexity. Especially, when a plurality of three-wire DC-DC converters are connected in parallel to supply power to a direct current load, wiring is simplified, and costs of the parallel power supply system are further reduced.

The solutions provided in this application have at least the following advantages.

An embodiment of this application provides a parallel power supply system, which includes a common wiring busbar, an input wiring busbar, an output wiring busbar, and at least two three-wire DC-DC converters. The parallel power supply system uses a three-wire DC-DC converter instead of a four-wire DC-DC converter. Each three-wire DC-DC converter includes a DC-DC conversion circuit, an input wiring terminal, an output wiring terminal, and a common wiring terminal. The parallel power supply system controls output voltages of all the three-wire DC-DC converters, and adjusts currents at the output wiring terminals of all the three-wire DC-DC converters to be consistent. Because the output wiring terminals of all the three-wire DC-DC converters are connected in parallel, output voltages of all the three-wire DC-DC converters are equal. In addition, it is known that power is equal to a product of a voltage and a current. Therefore, output power of all the three-wire DC-DC converters is equal. Moreover, because efficiency of all the three-wire DC-DC converters is equal, input power of all the three-wire DC-DC converters is equal. Because the input wiring terminals of all the three-wire DC-DC converters are connected in parallel, input voltages of all the three-wire DC-DC converters are equal. In addition, it is known that power is equal to a product of a voltage and a current. Therefore, input currents of all the three-wire DC-DC converters are also equal. According to Kirchhoff s law, a current at a common wiring terminal of a three-wire DC-DC converter is a difference between an input current at an input wiring terminal and an output current at an output wiring terminal. In addition, the output currents at the output wiring terminals are all equal, and the input currents at the input wiring terminals are all equal. Therefore, currents at the common wiring terminals of all the three-wire DC-DC converters are also equal. In this way, real current equalization control may be implemented between all the three-wire DC-DC converters. This avoids a case in which a DC-DC converter is damaged due to an excessively large return current of the DC-DC converter.

DESCRIPTION OF EMBODIMENTS

To make a person skilled in the art better understand the technical solutions provided in embodiments of this application, the following first describes a three-wire DC-DC converter.

Embodiment of a Three-Wire DC-DC Converter

Figure 2:
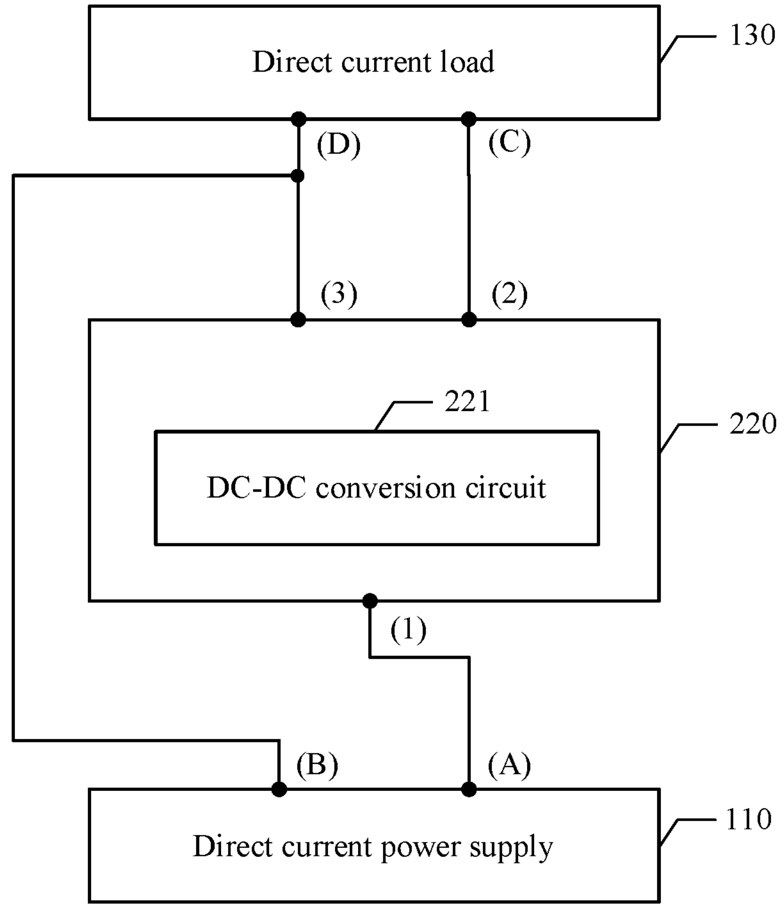
FIG. 2 is a schematic diagram of a three-wire DC-DC converter according to an embodiment of this application.

FIG. 2 is a schematic diagram of a three-wire DC-DC converter according to an embodiment of this application.

The three-wire DC-DC converter 220 includes a DC-DC conversion circuit 221 and three wiring terminals, which are respectively an input wiring terminal (1), an output wiring terminal (2), and a common wiring terminal (3).

The input wiring terminal (1) is configured to connect to a first power input terminal (A) of a direct current power supply 110, the output wiring terminal (2) is configured to connect to a first power terminal (C) of a direct current load 130, the common wiring terminal (3) is configured to connect to a second power terminal (D) of the direct current load 130, and the second power terminal (D) of the direct current load 130 is further configured to connect to a second power input terminal (B) of the direct current power supply 110.

A first voltage input by the direct current power supply 110 is transmitted to the DC-DC conversion circuit 221 through the input wiring terminal (1), and the DC-DC conversion circuit 221 converts the first voltage into a second voltage required by the direct current load 130, and transmits the second voltage to the direct current load 130 through the output wiring terminal (2).

A current direction is as follows: The current flows from the first power input terminal (A) of the direct current power supply 110 to the three-wire DC-DC converter 220 through the input wiring terminal (1), flows to the output wiring terminal (2), then flows to the first power terminal (C) of the direct current load 130, and finally flows back to the second power input terminal (B) of the direct current power supply 110 through the second power terminal (D) of the direct current load 130. The return current is divided into two branches. A first branch directly flows from the second power terminal (D) of the direct current load 130 back to the second power input terminal (B) of the direct current power supply 110. A second branch flows from the second power terminal (D) of the direct current load 130 back to the three-wire DC-DC converter 220 through the common wiring terminal (3). The return current of the first branch is greater than the return current of the second branch.

The following describes a current direction when a four-wire DC-DC converter is used. Still referring to FIG. 1, all four-wire DC-DC converters are connected in parallel. The following uses a four-wire DC-DC converter 1 as an example for description.

The four-wire DC-DC converter 1 includes four wiring terminals, which are respectively a first input wiring terminal (I), a second input wiring terminal (II), a first output wiring terminal (III), and a second output wiring terminal (IV).

A current direction is as follows: The current flows from the first power input terminal (A) of the direct current power supply 110 to the four-wire DC-DC converter 1 through the first input wiring terminal (I), flows to the first output wiring terminal (III), flows to the first power terminal (C) of the direct current load 130, then flows to the second output wiring terminal (IV) through the second power terminal (D) of the direct current load 130, and finally flows to the second power input terminal (B) of the direct current power supply through the second input wiring terminal (II).

It can be learned from the foregoing description that the return current fully flows back to the direct current power supply 110 through all the four-wire DC-DC converters.

Clearly, unlike the four-wire DC-DC converter, in the three-wire DC-DC converter provided in this embodiment, a current flowing back to the interior of the three-wire DC-DC converter is relatively small, and a large part of the return current flows back to the direct current power supply 110 from the outside, thereby facilitating heat dissipation inside the three-wire DC-DC converter.

The three-wire DC-DC converter provided in this embodiment of this application uses a three-wire topology structure instead of a four-wire topology structure. The three-wire DC-DC converter includes three wiring terminals, which are respectively an input wiring terminal, an output wiring terminal, and a common wiring terminal. The input wiring terminal is connected to a first power input terminal of a direct current power supply, the output wiring terminal is connected to a first power terminal of a direct current load, the common wiring terminal is connected to a second power terminal of the direct current load, and the second power terminal of the direct current load is connected to a second power input terminal of the direct current power supply. Therefore, compared with the four-wire DC-DC converter, the three-wire DC-DC converter reduces one wire, and changes a quantity of wiring terminals from four to three. Therefore, the three-wire DC-DC converter provided in this application may reduce a quantity of wires and a quantity of wiring terminals, and reduce wiring complexity. Especially, when a plurality of three-wire DC-DC converters are connected in parallel to supply power to a direct current load, wiring is simplified, and costs of the parallel power supply system are further reduced.

Embodiment 1 of a Parallel Power Supply System

As a requirement of a direct current load on a high-power direct current power supply increases continuously, a parallel power supply system is usually used; in other words, a plurality of parallel DC-DC converters are used to increase an output current of the direct current power supply, thereby meeting a power requirement of the direct current load.

Figure 1:
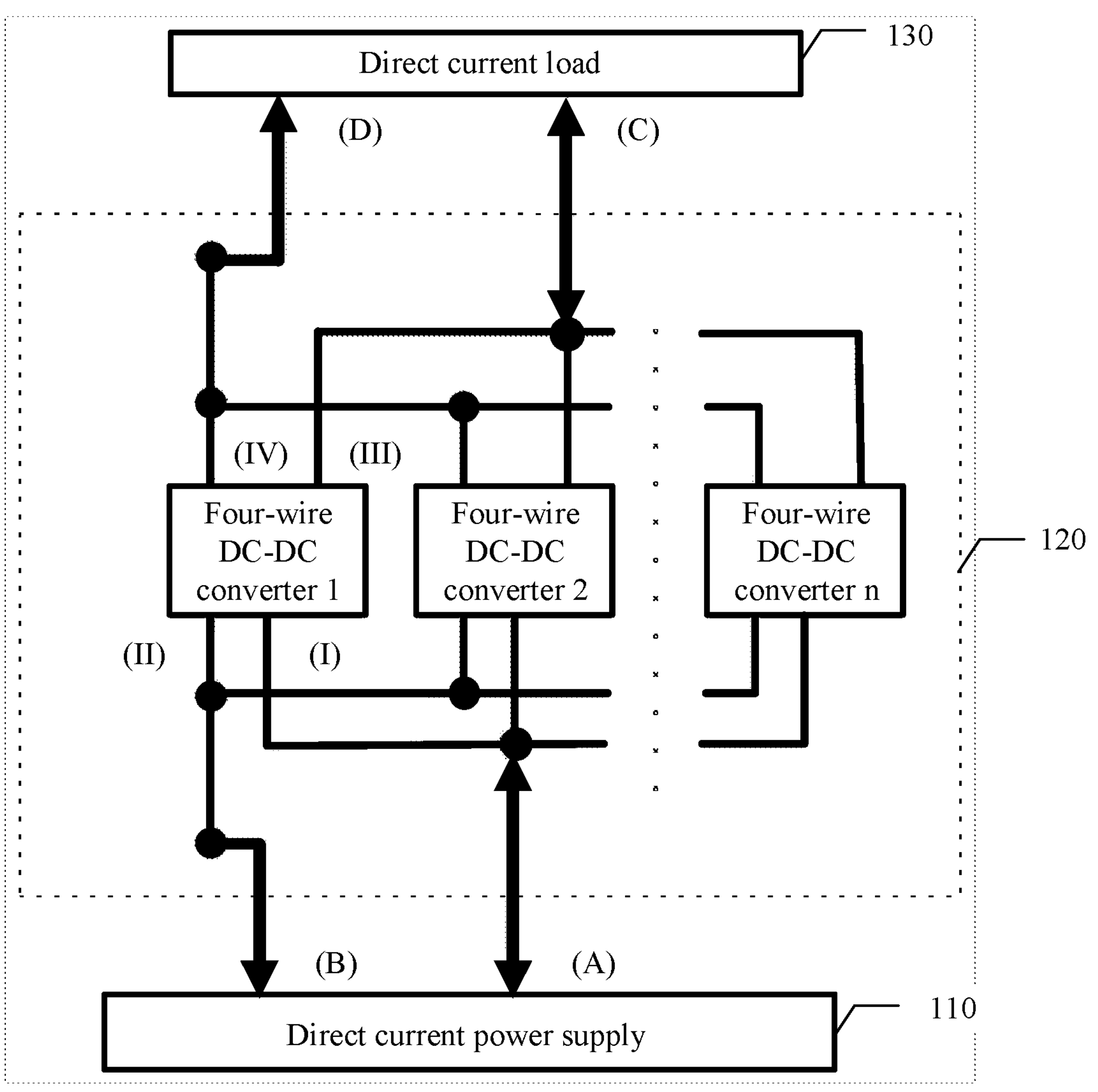
FIG. 1 is a schematic diagram of a DC-DC power system.

When all converters in the parallel power supply system are four-wire DC-DC converters, still referring to FIG. 1, the following uses the four-wire DC-DC converter 1 as an example for description.

A return current flowing from the second power terminal (D) of the direct current load 130 fully flows back to the direct current power supply 110 through all the four-wire DC-DC converters; in other words, the return current flows to the second input wiring terminal (II) through the second output wiring terminal (IV). A cable from the second output wiring terminal (IV) to the second input wiring terminal (II) is referred to as a return cable for short hereinafter, and return cables of all the four-wire DC-DC converters are connected in parallel. Therefore, return currents on the return cables of all the four-wire DC-DC converters are related only to cable impedance matching. As a result, a parallel power supply system 120 cannot control the return current on the return cable of each four-wire DC-DC converter.

Therefore, when impedance of a return cable of a four-wire DC-DC converter is relatively low, the four-wire DC-DC converter withstands a large part of the return current of the parallel power supply system 120, and the four-wire DC-DC converter is damaged due to an overcurrent. For example, when impedance of the return cable of the four-wire DC-DC converter 1 is relatively low, a large part of the total return current of the parallel power supply system 120 flows back to the second power input terminal (B) of the direct current power supply 110 through the return cable of the four-wire DC-DC converter 1. As a result, the four-wire DC-DC converter 1 is burnt.

To resolve the foregoing problem, this embodiment of this application provides a parallel power supply system, where at least two three-wire DC-DC converters shown in FIG. 2 are used. Details are described below with reference to the accompanying drawings.

Figure 3:
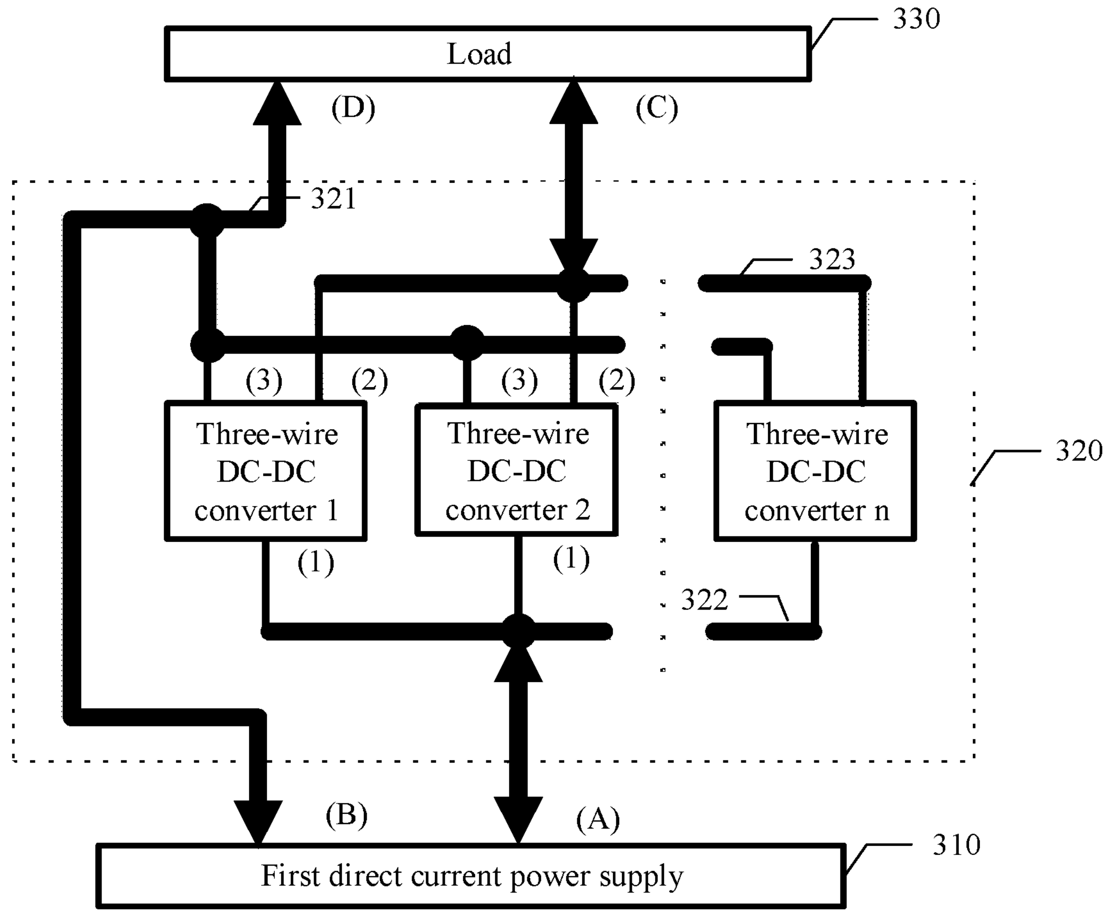
FIG. 3 is a schematic diagram of a parallel power supply system according to an embodiment of this application.

FIG. 3 is a schematic diagram of a parallel power supply system according to an embodiment of this application.

The parallel power supply system 320 includes a common wiring busbar 321, an input wiring busbar 322, an output wiring busbar 323, and n three-wire DC-DC converters, where n is an integer greater than 1. During actual power supply, the value of n may be set based on a requirement of a load. For example, n may be 2, 3, 4, or a larger value. A structure of each three-wire DC-DC converter is the same as a structure of the three-wire DC-DC converter shown in FIG. 2. Details are not described herein again.

Input wiring terminals of all the three-wire DC-DC converters are connected in parallel to the input wiring busbar 322, output wiring terminals of all the three-wire DC-DC converters are connected in parallel to the output wiring busbar 323, and common wiring terminals of all the three-wire DC-DC converters are connected in parallel to the common wiring busbar 321.

The following uses a three-wire DC-DC converter 1 and a three-wire DC-DC converter 2 as examples for description. Connection relationships of other three-wire DC-DC converters are the same as connection relationships described herein, and details are not described again.

An input wiring terminal (1) of the three-wire DC-DC converter 1 is connected to the input wiring busbar 322, an input wiring terminal (1) of the three-wire DC-DC converter 2 is connected to the input wiring busbar 322, and the input wiring terminal (1) of the three-wire DC-DC converter 1 and the input wiring terminal (1) of the three-wire DC-DC converter 2 are connected in parallel. An output wiring terminal (2) of the three-wire DC-DC converter 1 is connected to the output wiring busbar 323, an output wiring terminal (2) of the three-wire DC-DC converter 2 is connected to the output wiring busbar 323, and the output wiring terminal (2) of the three-wire DC-DC converter 1 and the output wiring terminal (2) of the three-wire DC-DC converter 2 are connected in parallel. A common wiring terminal (3) of the three-wire DC-DC converter 1 is connected to the common wiring busbar 321, a common wiring terminal (3) of the three-wire DC-DC converter 2 is connected to the common wiring busbar 321, and the common wiring terminal (3) of the three-wire DC-DC converter 1 and the common wiring terminal (3) of the three-wire DC-DC converter 2 are connected in parallel.

The input wiring busbar 322 is configured to connect to a first power input terminal (A) of a first direct current power supply 310, the output wiring busbar 323 is configured to connect to a first power terminal (C) of a load 330, and the common wiring busbar 321 is configured to connect to a second power terminal (D) of the load 330 and a second power input terminal (B) of the first direct current power supply 310.

The common wiring busbar 321 not only connects the common wiring terminals of all the three-wire DC-DC converters, but also serves as a loop between the load 330 and the first direct current power supply 310 to connect the load 330 and the first direct current power supply 310.

Three-wire DC-DC conversion circuits of all the three-wire DC-DC converters separately convert a voltage of the first direct current power supply 310 into a voltage required by the load 330 and output the voltage, and output currents at output wiring terminals of all the three-wire DC-DC converters are consistent. The three-wire DC-DC conversion circuit is located inside the three-wire DC-DC converter and is not shown in the figure.

It should be noted that output currents being consistent may be understood as that output currents are equal; in other words, output currents of all the DC-DC converters are equalized. That currents are consistent may be that the currents are absolutely equal, or may be that the currents are equivalently considered equal within an allowable error range.

Because the output wiring terminals of all the three-wire DC-DC converters are connected in parallel, output voltages of all the three-wire DC-DC converters are equal, and magnitudes of output currents at the output wiring terminals of all the three-wire DC-DC converters are consistent. In addition, it is known that power is equal to a product of a voltage and a current. Therefore, output power of all the three-wire DC-DC converters is equal.

Moreover, because efficiency of all the three-wire DC-DC converters is equal, input power of all the three-wire DC-DC converters is equal.

Because the input wiring terminals of all the three-wire DC-DC converters are connected in parallel, input voltages of all the three-wire DC-DC converters are equal. In addition, it is known that power is equal to a product of a voltage and a current. Therefore, input currents of all the three-wire DC-DC converters are equal.

According to Kirchhoff's law, a current at a common wiring terminal of a three-wire DC-DC converter is a difference between an input current at an input wiring terminal and an output current at an output wiring terminal. Because the output currents at the output wiring terminals are all equal and the input currents at the input wiring terminals are all equal, currents at the common wiring terminals of all the three-wire DC-DC converters are also equal.

Therefore, the input currents, the output currents, and the currents at the common wiring terminals of all the three-wire DC-DC converters are equal to each other; in other words, the currents corresponding to the wiring terminals of the three-wire DC-DC converters are equal to each other. In this way, real current equalization can be implemented. Therefore, damage to a DC-DC converter due to an overcurrent does not occur.

This embodiment of this application provides a parallel power supply system. The parallel power supply system includes a common wiring busbar, an input wiring busbar, an output wiring busbar, and at least two three-wire DC-DC converters. Each three-wire DC-DC converter includes a DC-DC conversion circuit, an input wiring terminal, an output wiring terminal, and a common wiring terminal. Input wiring terminals of all the three-wire DC-DC converters are connected in parallel to the input wiring busbar, output wiring terminals of all the three-wire DC-DC converters are connected in parallel to the output wiring busbar, and the common wiring terminals of all the three-wire DC-DC converters are connected in parallel to the common wiring busbar. The input wiring busbar is configured to connect to a first power input terminal of a first direct current power supply, the output wiring busbar is configured to connect to a first power terminal of a load, and the common wiring busbar is configured to connect a second power terminal of the load and a second power input terminal of the first direct current power supply. All the three-wire DC-DC converters convert a voltage of the first direct current power supply into a voltage required by the load and output the voltage, and output currents at the output wiring terminals of all the three-wire DC-DC converters are consistent.

In conclusion, the parallel power supply system controls the output currents at the output wiring terminals of all the three-wire DC-DC converters, to enable the output currents at the output wiring terminals of all the three-wire DC-DC converters to be consistent, so that the currents at the input wiring terminals of all the three-wire DC-DC converters are consistent and the currents at the common wiring terminals of all the three-wire DC-DC converters are consistent; in other words, current equalization control at three wiring terminals of all the three-wire DC-DC converters is implemented. This avoids a case in which a DC-DC converter is damaged due to an excessively large return current of the DC-DC converter.

Embodiment 2 of a Parallel Power Supply System

To avoid a case in which a DC-DC converter is damaged due to an excessively large return current of the DC-DC converter, the following describes, with reference to the accompanying drawings, a manner in which a parallel power supply system controls output currents at output wiring terminals of all three-wire DC-DC converters to be consistent.

This embodiment of this application does not limit the manner in which the parallel power supply system controls output currents at output wiring terminals of all three-wire DC-DC converters to be consistent.

The following provides description by using an example in which a controller controls the output currents at the output wiring terminals of all the three-wire DC-DC converters to be consistent.

Compared with the parallel power supply system shown in FIG. 3, the parallel power supply system provided in this embodiment of this application further includes a controller. The at least two three-wire DC-DC converters include a first three-wire DC-DC converter and a second three-wire DC-DC converter, and the parallel power supply system further includes a first current detection circuit and a second current detection circuit.

During actual power supply, a quantity of three-wire DC-DC converters may be set based on a requirement of a load. For example, there may be two, three, or more three-wire DC-DC converters.

The following provides description by using an example in which the parallel power supply system includes two three-wire DC-DC converters.

Figure 4:
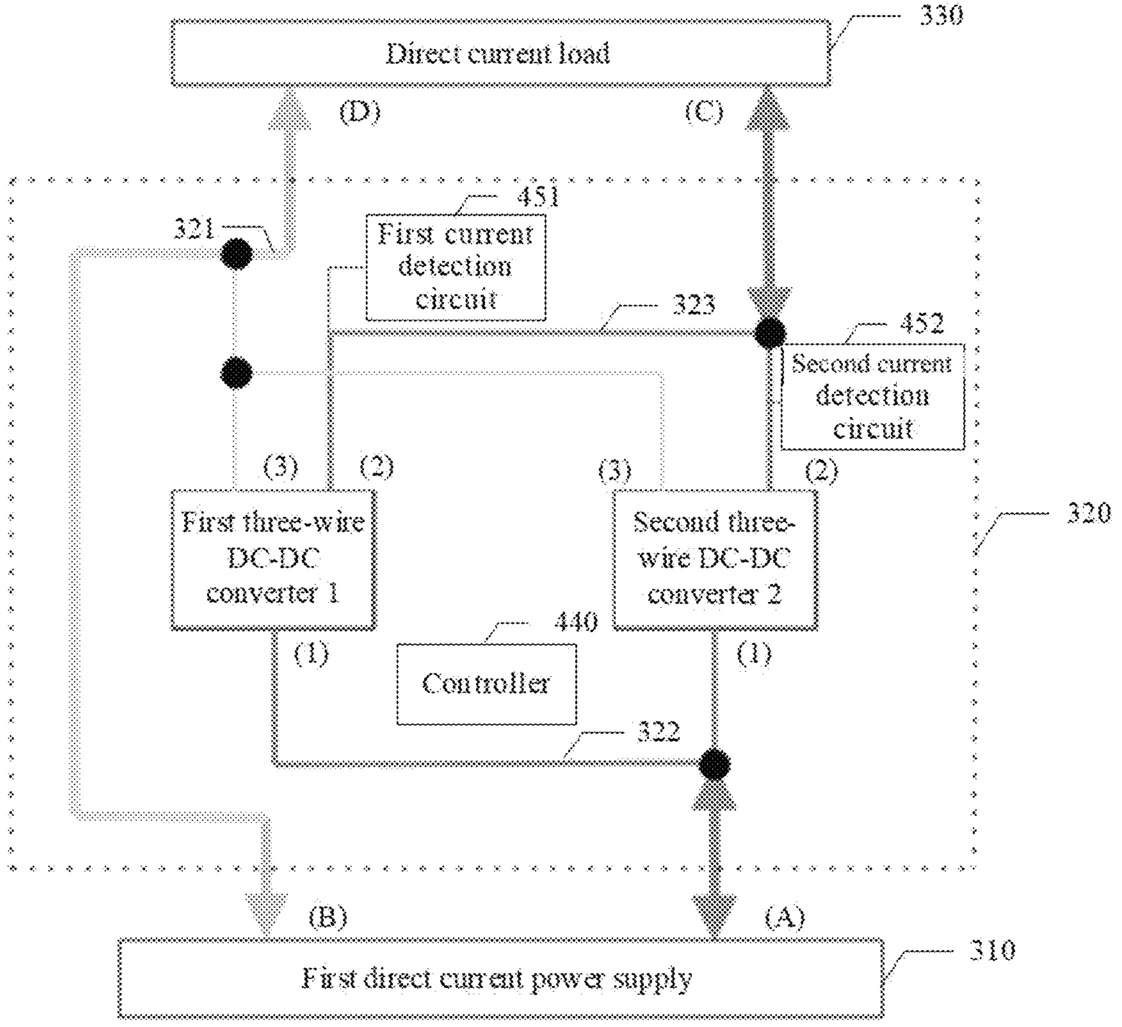
FIG. 4 is a schematic diagram of another parallel power supply system according to an embodiment of this application.

FIG. 4 is a schematic diagram of another parallel power supply system according to an embodiment of this application.

Compared with the parallel power supply system shown in FIG. 3, the parallel power supply system further includes a controller 440. Other similarities are not described again, and differences are described below.

A location of the controller 440 is not limited in this embodiment of this application. For example, the controller 440 may be located inside the parallel power supply system 320, or the controller may exist independently of the parallel power supply system 320.

The two three-wire DC-DC converters are respectively a first three-wire DC-DC converter 1 and a three-wire DC-DC converter 2.

A first current detection circuit 451 is configured to detect a first current at an output wiring terminal (2) of the first three-wire DC-DC converter 1 and transmit the first current to the controller 440.

A second current detection circuit 452 is configured to detect a second current at an output wiring terminal (2) of the second three-wire DC-DC converter 2 and transmit the second current to the controller 440.

The controller 440 is configured to control an output voltage of the first three-wire DC-DC converter 1 to enable the first current to be consistent with a preset current and control an output voltage of the second three-wire DC-DC converter 2 to enable the second current to be consistent with the preset current.

The controller 440 controls the output voltages of all the three-wire DC-DC converters to control output currents of all the three-wire DC-DC converters, so that the output currents of all the three-wire DC-DC converters are adjusted to be consistent with the preset current, thereby implementing current equalization control of all the three-wire DC-DC converters.

A magnitude of the preset current is not limited in this embodiment of this application, and may be set by a person skilled in the art based on an actual requirement.

This embodiment of this application provides a parallel power supply system. A controller is used to control output voltages of all three-wire DC-DC converters in the parallel power supply system, to adjust currents at output wiring terminals of all the three-wire DC-DC converters to be consistent with a preset current, so that the currents at the output wiring terminals of all the three-wire DC-DC converters are controlled to be consistent. Because the output wiring terminals of all the three-wire DC-DC converters are connected in parallel, the output voltages of all the three-wire DC-DC converters are equal. In addition, it is known that power is equal to a product of a voltage and a current. Therefore, output power of all the three-wire DC-DC converters is equal. Moreover, because efficiency of all the three-wire DC-DC converters is equal, input power of all the three-wire DC-DC converters is equal. Because input wiring terminals of all the three-wire DC-DC converters are connected in parallel, input voltages of all the three-wire DC-DC converters are equal. In addition, it is known that power is equal to a product of a voltage and a current. Therefore, input currents of all the three-wire DC-DC converters are equal. According to Kirchhoff s law, a current at a common wiring terminal of a three-wire DC-DC converter is a difference between an input current at an input wiring terminal and an output current at an output wiring terminal. Because the output currents at the output wiring terminals are all equal and the input currents at the input wiring terminals are all equal, currents at the common wiring terminals of all the three-wire DC-DC converters are also equal. In addition, the currents at the input wiring terminals of all the three-wire DC-DC converters are consistent, and the currents at the common wiring terminals of all the DC-DC converters are consistent. Therefore, real current equalization control of all the three-wire DC-DC converters is implemented.

In this embodiment of this application, not only the controller can be used to control the output currents at the output wiring terminals of all the three-wire DC-DC converters to be consistent, but also a communication manner can be used to control the output currents at the output wiring terminals of all the three-wire DC-DC converters to be consistent. For example, when two three-wire DC-DC converters communicate with each other, one of the three-wire DC-DC converters may serve as a host to transmit current equalization information to the other three-wire DC-DC converter, thereby ensuring that the output currents are equal.

Embodiment 3 of a Parallel Power Supply System

Currently, to reduce an electrolysis phenomenon and play a role of anticorrosion of a device housing, a communication device usually uses a negative voltage to supply power.

However, there is a common problem on communication devices. After initial construction of some communication devices is completed, when a load needs to be increased later, an original DC-DC power system of the communication device cannot be expanded due to limitations such as system space and a capability of a heat dissipation device. In this case, an additional generator and DC-DC power system need to be added; in other words, two or more DC-DC power systems are required for parallel operation.

A type of the communication device is not limited in this embodiment of this application. For example, the communication device may be a communication base station or a server.

The following provides description by using an example in which two direct current power supplies are paralleled and a parallel power supply system includes two three-wire DC-DC converters.

Figure 5A:
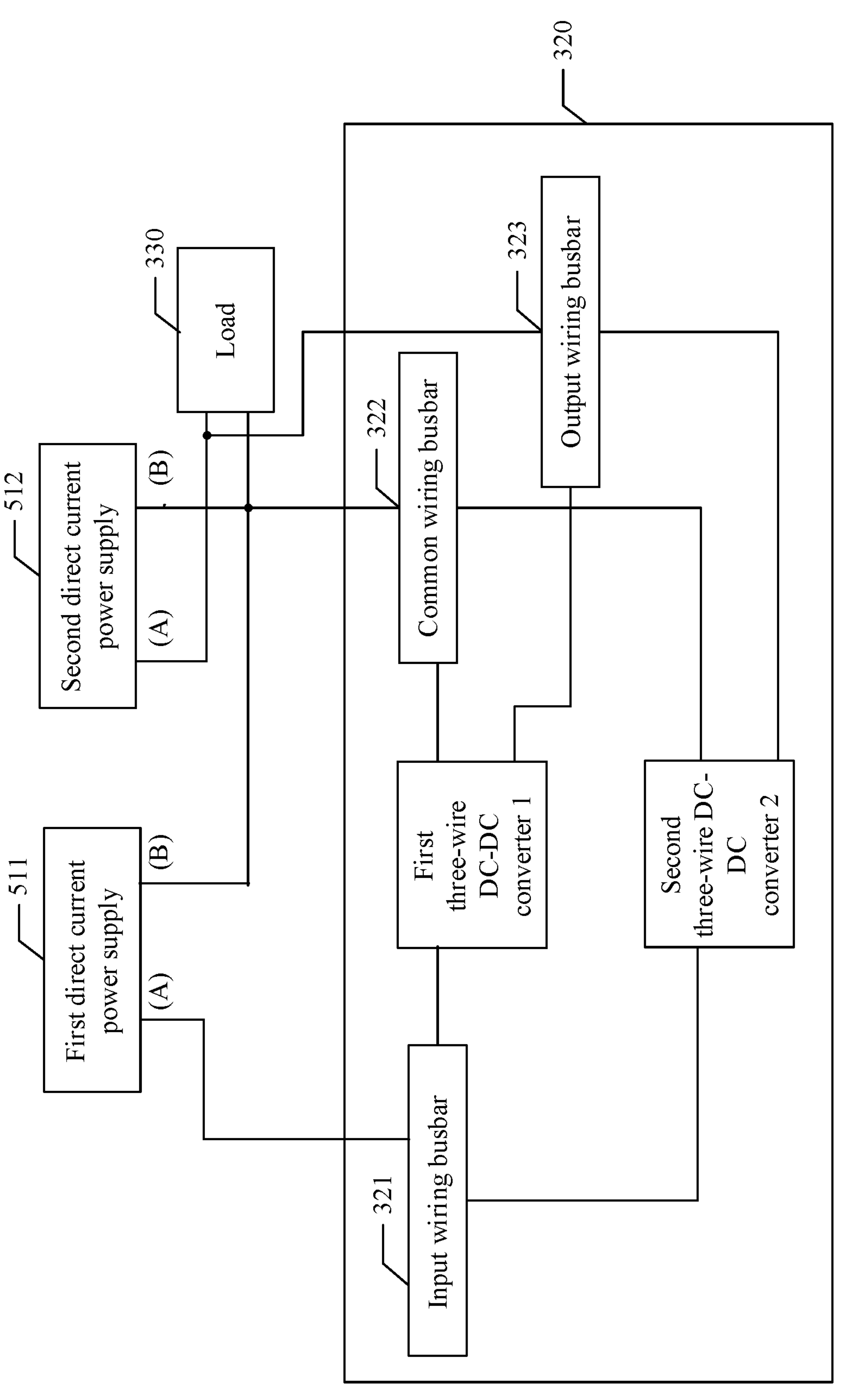
FIG. 5A is a schematic diagram of a parallel operation of two direct current power supplies according to an embodiment of this application.

FIG. 5A is a schematic diagram of a parallel operation of two direct current power supplies according to an embodiment of this application.

The parallel power supply system further includes a first direct current power supply 511 and a second direct current power supply 512. Voltages of the first direct current power supply 511 and the second direct current power supply 512 are different. For example, the voltage of the first direct current power supply is negative 48 volts, and the voltage of the second direct current power supply is negative 57 volts.

A connection relationship between the first direct current power supply 511, the parallel power supply system 320, and a load 330 is the same as the connection relationship between the first direct current power supply 310, the parallel power supply system 320, and the load 330 in the embodiment in FIG. 3. Details are not described herein again. Differences between FIG. 5A and FIG. 3 are described below.

An output wiring busbar 323 is connected to a first power input terminal (A) of the second direct current power supply 512, and the first power input terminal (A) of the second direct current power supply 512 is connected to the load 330.

A common wiring busbar 322 is connected to a second power input terminal (B) of the first direct current power supply 511, and the common wiring busbar 322 is connected to a second power input terminal (B) of the second direct current power supply 512.

Each three-wire DC-DC converter, namely, a first three-wire DC-DC converter 1 and a second three-wire DC-DC converter 2, converts a voltage at a first power input terminal (A) of the first direct current power supply 511 to be consistent with a voltage at the first power input terminal (A) of the second direct current power supply 512.

The parallel power supply system 320 can convert a voltage output by the first direct current power supply 511 into a voltage consistent with the second direct current power supply 512. In this way, when the second direct current power supply 512 cannot be expanded, the first direct current power supply 511 supplies power to the load 330 of the second direct current power supply 512.

The following provides description by using an example in which the embodiment in FIG. 5A is applied to a communication base station.

A busbar of a DC-DC power system on a live network of some communication base stations is negative 53.5 volts, whereas a busbar of a new DC-DC power system is negative 57 volts. For example, currently, a power supply used for 4G communication is negative 53.5 volts (that is, −53.5 V), whereas a power supply used for 5G communication is negative 57 volts (that is, −57 V). To retain the existing power supply of 4G to be used without being eliminated and to save the device, the −53.5 V voltage needs to be converted into the −57 V voltage to supply power for 5G communication.

When the new DC-DC power system cannot be expanded, the DC-DC power system on the live network of the communication base station may be paralleled with the new DC-DC power system to supply power to a load in the new DC-DC power system. The voltage output by the DC-DC power system on the live network of the base station is converted from negative 53.5 volts to negative 57 volts to supply power to the load in the new DC-DC power system, thereby meeting a requirement of the load.

When direct current power supplies of the two systems, namely, the first direct current power supply and the second direct current power supply, cooperatively work, a power supply manner may be set to preferential power supply and backup power supply. The following separately describes the foregoing two power supply manners with reference to FIG. 5B.

Figure 5B:
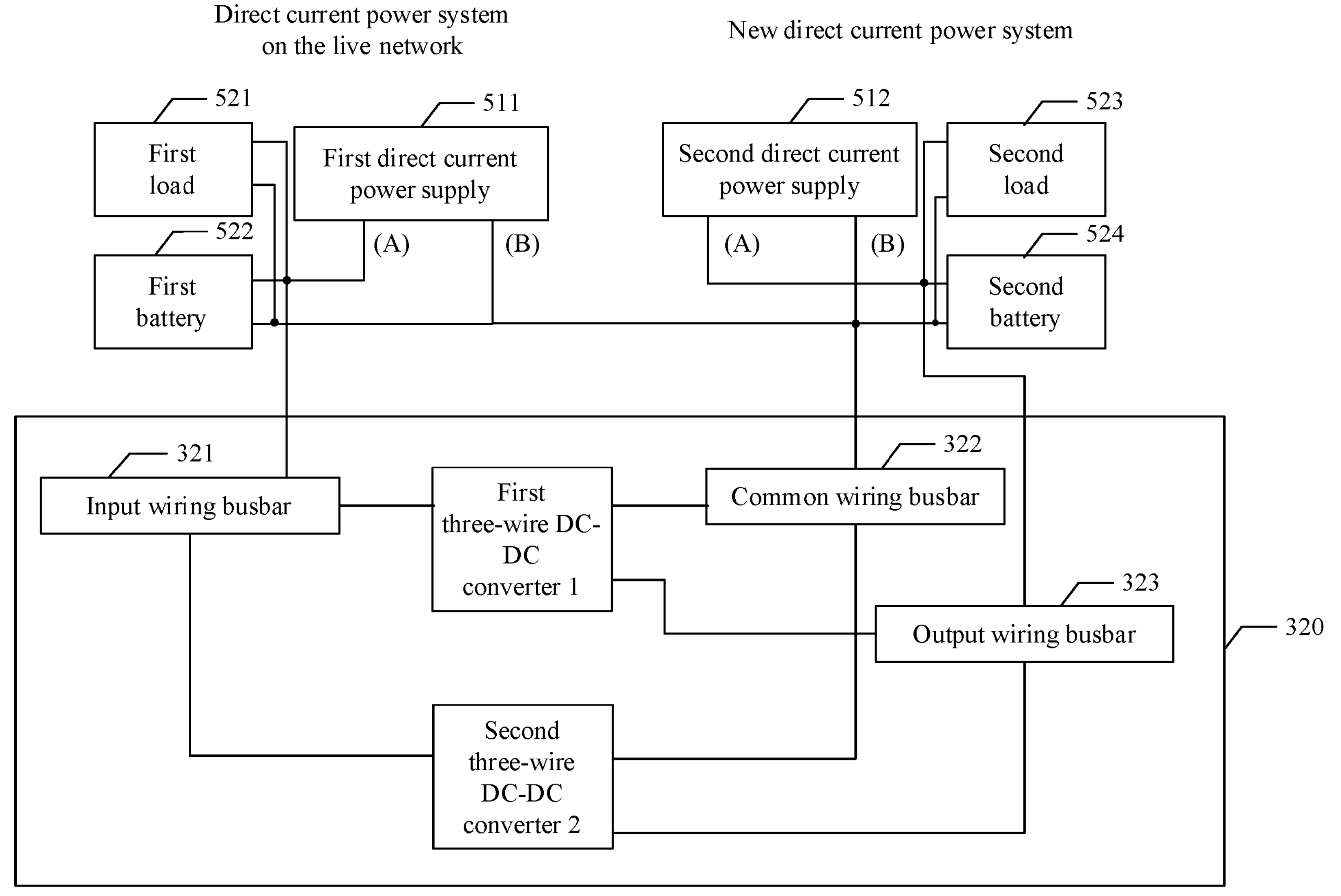
FIG. 5B is a schematic diagram of another parallel operation of two direct current power supplies according to an embodiment of this application.

FIG. 5B is a schematic diagram of another parallel operation of two direct current power supplies according to an embodiment of this application.

First manner: preferential power supply.

The controller controls all the three-wire DC-DC converters to transmit all remaining electric energy of the first direct current power supply to the load after conversion.

The first direct current power supply 511 in the DC-DC power system on the live network supplies power to a load in the DC-DC power system on the live network. There are three cases in total. The load may be a communication base station, a backup battery, or the like.

The following describes three power supply cases by using an example in which loads are a first load 521 and a first battery 522.

Case 1: The first direct current power supply 511 supplies power only to the first load 521.

Case 2: The first direct current power supply 511 supplies power only to the first load 521, and supplies power to the first battery 522 when power of the first battery 522 is insufficient.

Case 3: When the first direct current power supply 511 cannot supply power to the first load 521 due to a fault or another reason, the first battery 522 supplies power to the first load 521.

When the first direct current power supply 511 has remaining electric energy after supplying power to the load in the DC-DC power system on the live network, the controller controls the first three-wire DC-DC converter 1 and the second three-wire DC-DC converter 2 in the parallel power supply system 320 to convert the remaining electric energy into a voltage consistent with the second direct current power supply 512 in the new DC-DC power system, to supply power to the load in the new DC-DC power system. The load may be, for example, a second load 523 or a second battery 524.

Second manner: backup power supply.

The controller may continuously use the remaining electric energy of the first direct current power supply 511 to supply power to the load of the second direct current power supply 512. The controller may further control all the three-wire DC-DC converters to transmit the remaining electric energy of the first direct current power supply 511 to the load after conversion only when the second direct current power supply 512 is insufficient to meet an electric energy requirement of the load.

When the second direct current power supply 512 in the new DC-DC power system is insufficient to meet electric energy requirements of the second load 523 and the second battery 524, the controller converts the remaining electric energy of the first direct current power supply 511 in the DC-DC power system on the live network into voltages required by the second load 523 and the second battery 524, to supply power to the second load 523 and the second battery 524. Three power supply cases are described above, and are not described herein again.

A manner in which the controller controls all the three-wire DC-DC converters is not limited in this embodiment of this application. For example, the controller may control an output current of the output wiring busbar of all the three-wire DC-DC converters to be consistent with an output current of the second direct current power supply.

This embodiment of this application provides a parallel power supply system to convert the output voltage of the first direct current power supply to be consistent with the output voltage of the second direct current power supply, thereby supplying power to the load of the second direct current power supply. The parallel power supply system controls the output currents at the output wiring terminals of all the three-wire DC-DC converters, to enable the output current at the output wiring terminal of each three-wire DC-DC converter to be consistent with the preset current, so that the currents at the common wiring terminals of all the three-wire DC-DC converters are consistent; in other words, the current equalization control of all the three-wire DC-DC converters is implemented. This avoids a case in which a DC-DC converter is damaged due to an excessively large return current of the DC-DC converter.

Embodiment 4 of a Parallel Power Supply System

The following describes a topology structure of a DC-DC conversion circuit in a three-wire DC-DC converter with reference to the accompanying drawings.

The topology structure of the DC-DC conversion circuit in the three-wire DC-DC converter is not limited in this embodiment of this application. For example, the topology structure of the DC-DC conversion circuit may be at least any one of the following types: an H-bridge circuit, a Buck circuit, a Boost circuit, a BuckBoost circuit, a Cuk circuit, a Sepic circuit, and a Zeta circuit. In other words, a single DC-DC conversion circuit may be any one of the foregoing seven types of circuits, or may be a topology structure of a combination or variants of at least two of the foregoing seven types of circuits.

The following separately describes the topology structures of the seven types of DC-DC conversion circuits with reference to the accompanying drawings.

First type: H-bridge circuit.

Figure 6:
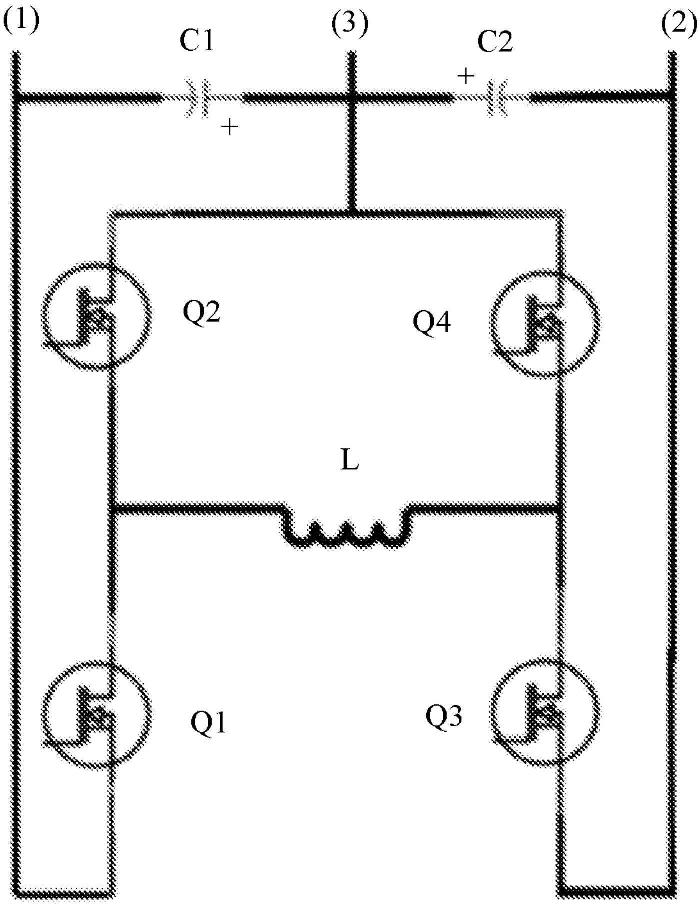
FIG. 6 is a schematic diagram of a topology structure of a DC-DC conversion circuit according to an embodiment of this application.

FIG. 6 is a schematic diagram of a topology structure of a DC-DC conversion circuit according to an embodiment of this application.

When the DC-DC conversion circuit is an H-bridge circuit, the DC-DC conversion circuit includes a first switching transistor Q1, a second switching transistor Q2, a third switching transistor Q3, a fourth switching transistor Q4, an inductor L, a first capacitor C1, and a second capacitor C2.

A first terminal of the first switching transistor Q1 is connected to an input wiring terminal (1), and a second terminal of the first switching transistor Q1 is connected to a first terminal of the second switching transistor Q2.

A second terminal of the second switching transistor Q2 is connected to a common wiring terminal (3).

A first terminal of the third switching transistor Q3 is connected to an output wiring terminal (2), a second terminal of the third switching transistor Q3 is connected to a first terminal of the fourth switching transistor Q4, and a second terminal of the fourth switching transistor Q4 is connected to the common wiring terminal (2).

The first capacitor C1 is connected between the input wiring terminal (1) and the common wiring terminal (3), and the second capacitor C2 is connected between the common wiring terminal (3) and the output wiring terminal (2).

The inductor L is connected between the second terminal of the first switching transistor Q1 and the second terminal of the third switching transistor Q3.

Figure 7:
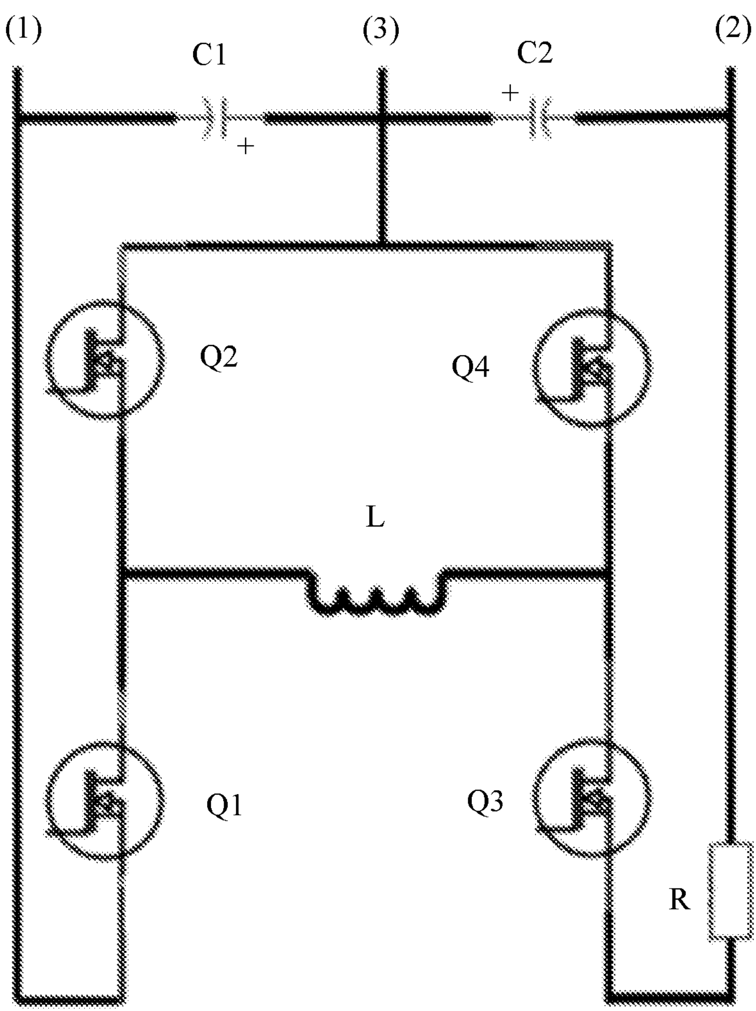
FIG. 7 is a schematic diagram of a current equalization control manner of all three-wire DC-DC converters according to an embodiment of this application.

In embodiment 2 of a parallel power supply system, the controller may control the output voltages of all the three-wire DC-DC converters, to control the currents at the output wiring terminals of all the three-wire DC-DC converters to be consistent with the preset current, so that the currents at the output wiring terminals of all the three-wire DC-DC converters are consistent, thereby implementing the current equalization control of all the three-wire DC-DC converters. With reference to FIG. 7, the following describes a current equalization control manner of all three-wire DC-DC converters by using an example in which the DC-DC conversion circuit is an H-bridge circuit.

FIG. 7 is a schematic diagram of a current equalization control manner of all three-wire DC-DC converters according to an embodiment of this application.

The first terminal of the third switching transistor Q3 is connected to the output wiring terminal (2) through a sampling resistor R. Other connection manners are the same as the connection manners of the H-bridge circuit shown in FIG. 6, and details are not described herein again.

Voltages at both terminals of the sampling resistor R are measured. It is known that a voltage is equal to a product of a current and resistance. Therefore, a current passing through the sampling resistor R may be obtained; in other words, an output current at the output wiring terminal (2) is obtained. Therefore, the output current at the output wiring terminal (2) may be adjusted by controlling the voltages at both terminals of the sampling resistor R, so that output currents at the output wiring terminals of all the three-wire DC-DC converters are controlled to be consistent, thereby implementing current equalization control of the parallel power supply system.

A manner of obtaining the output current at the output wiring terminal is not limited in this embodiment of this application. For example, the output current at the output wiring terminal (2) may be alternatively directly detected.

A type of a current detection device is not limited in this embodiment of this application. For example, the current detection device may be a Hall sensor, a shunt, or the like.

Second type: Buck circuit.

Figure 8:
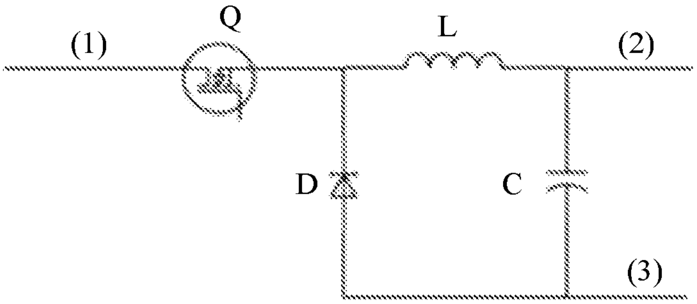
FIG. 8 is a schematic diagram of a topology structure of another DC-DC conversion circuit according to an embodiment of this application.

FIG. 8 is a schematic diagram of a topology structure of another DC-DC conversion circuit according to an embodiment of this application.

When the DC-DC conversion circuit is a Buck circuit, the DC-DC conversion circuit includes a switching transistor Q, a diode D, an inductor L, and a capacitor C.

A first terminal of the switching transistor Q is connected to an input wiring terminal (1), and a second terminal of the switching transistor Q is connected to an output wiring terminal (2) through the inductor L.

The second terminal of the switching transistor Q is connected to a cathode of the diode D, and an anode of the diode D is connected to a common wiring terminal (3).

The capacitor is connected between the output wiring terminal (2) and the common wiring terminal (3).

Third type: Boost circuit.

Figure 9:
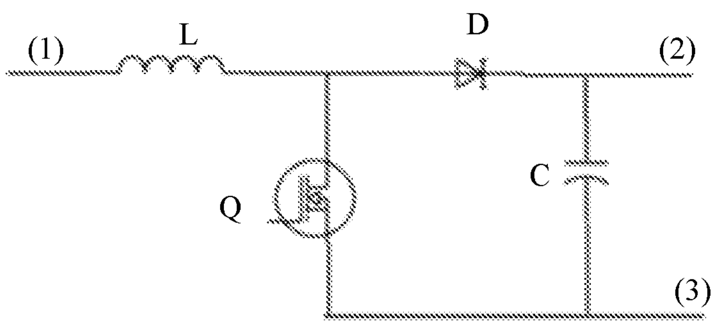
FIG. 9 is a schematic diagram of a topology structure of still another DC-DC conversion circuit according to an embodiment of this application.

FIG. 9 is a schematic diagram of a topology structure of still another DC-DC conversion circuit according to an embodiment of this application.

When the DC-DC conversion circuit is a Boost circuit, the DC-DC conversion circuit includes a switching transistor Q, a diode D, an inductor L, and a capacitor C.

A first terminal of the inductor L is connected to an input wiring terminal (1), and a second terminal of the inductor L is connected to a common wiring terminal (3) through the switching transistor Q.

The second terminal of the inductor L is connected to an anode of the diode D, and a cathode of the diode D is connected to an output wiring terminal (2).

The capacitor C is connected between the output wiring terminal (2) and the common wiring terminal (3).

Fourth type: BuckBoost circuit.

Figure 10:
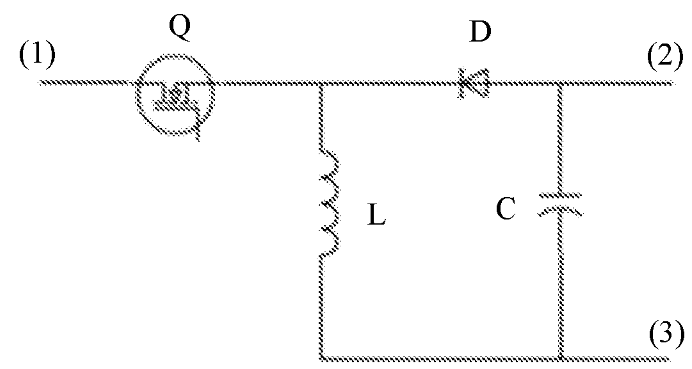
FIG. 10 is a schematic diagram of a topology structure of yet another DC-DC conversion circuit according to an embodiment of this application.

FIG. 10 is a schematic diagram of a topology structure of yet another DC-DC conversion circuit according to an embodiment of this application.

When the DC-DC conversion circuit is a BuckBoost circuit, the DC-DC conversion circuit includes a switching transistor Q, a diode D, an inductor L, and a capacitor C.

A first terminal of the switching transistor Q is connected to an input wiring terminal (1), and a second terminal of the switching transistor Q is connected to a common wiring terminal (3) through the inductor L.

The second terminal of the switching transistor Q is connected to a cathode of the diode D, and an anode of the diode D is connected to an output wiring terminal (2).

The capacitor C is connected between the output wiring terminal (2) and the common wiring terminal (3).

Fifth type: Cuk circuit.

Figure 11:
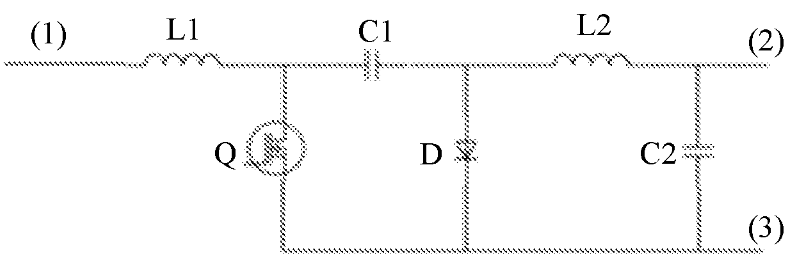
FIG. 11 is a schematic diagram of a topology structure of another DC-DC conversion circuit according to an embodiment of this application.

FIG. 11 is a schematic diagram of a topology structure of another DC-DC conversion circuit according to an embodiment of this application.

When the DC-DC conversion circuit is a Cuk circuit, the DC-DC conversion circuit includes a first inductor L1, a second inductor L2, a first capacitor C1, a second capacitor C2, a switching transistor Q, and a diode D.

A first terminal of the first inductor L1 is connected to an input wiring terminal (1), and a second terminal of the first inductor L1 is connected to a common wiring terminal (3) through the switching transistor Q.

The second terminal of the first inductor L1 is connected to a first terminal of the first capacitor C1, and a second terminal of the first capacitor C1 is connected to an output wiring terminal (2) through the second inductor L2.

The second terminal of the first capacitor C1 is connected to an anode of the diode D, and a cathode of the diode D is connected to the common wiring terminal (3).

The second capacitor C2 is connected between the output wiring terminal (2) and the common wiring terminal (3).

Sixth type: Sepic circuit.

Figure 12:
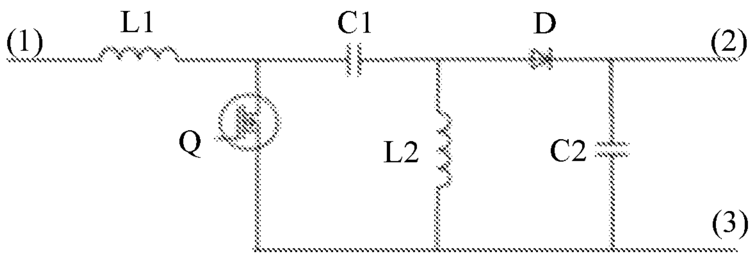
FIG. 12 is a schematic diagram of a topology structure of still another DC-DC conversion circuit according to an embodiment of this application.

FIG. 12 is a schematic diagram of a topology structure of still another DC-DC conversion circuit according to an embodiment of this application.

When the DC-DC conversion circuit is a Sepic circuit, the DC-DC conversion circuit includes a first inductor L1, a second inductor L2, a first capacitor C1, a second capacitor C2, a switching transistor Q, and a diode D.

A first terminal of the first inductor L1 is connected to an input wiring terminal (1), and a second terminal of the first inductor L1 is connected to a common wiring terminal (3) through the switching transistor Q.

The second terminal of the first inductor L1 is connected to a first terminal of the first capacitor C1, and a second terminal of the first capacitor C1 is connected to the common wiring terminal (3) through the second inductor L2.

The second terminal of the first capacitor C1 is connected to an anode of the diode D, and a cathode of the diode D is connected to an output wiring terminal (2).

The second capacitor C2 is connected between the output wiring terminal (2) and the common wiring terminal (3).

Seventh type: Zeta circuit.

Figure 13:
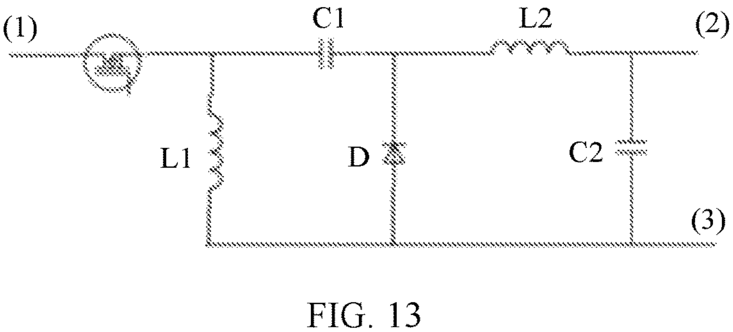
FIG. 13 is a schematic diagram of a topology structure of yet another DC-DC conversion circuit according to an embodiment of this application.

FIG. 13 is a schematic diagram of a topology structure of yet another DC-DC conversion circuit according to an embodiment of this application.

When the DC-DC conversion circuit is a Zeta circuit, the DC-DC conversion circuit includes a first inductor L1, a second inductor L2, a first capacitor C1, a second capacitor C2, a switching transistor Q, and a diode D.

A first terminal of the switching transistor Q is connected to an input wiring terminal (1), and a second terminal of the switching transistor Q is connected to a common wiring terminal (3) through the first inductor L1.

The second terminal of the switching transistor Q is connected to a first terminal of the first capacitor C1, and a second terminal of the first capacitor C1 is connected to an output wiring terminal (2) through the second inductor L2.

The second terminal of the first capacitor C1 is connected to a cathode of the diode D, and an anode of the diode D is connected to the common wiring terminal (3).

The second capacitor C2 is connected between the output wiring terminal (2) and the common wiring terminal (3).

Embodiment 5 of a Parallel Power Supply System

A power flow of a three-wire DC-DC converter in a parallel power supply system provided in this application can flow unidirectionally; in other words, for example, the three-wire DC-DC converters in embodiment 1 of a parallel power supply system to embodiment 4 of a parallel power supply system all convert a voltage input by an input wiring busbar into another voltage and output the another voltage. In addition, the power flow of the three-wire DC-DC converter in the parallel power supply system provided in this application can further flow bidirectionally; in other words, a voltage input by an output wiring busbar is converted into another voltage and the another voltage is output. The following provides detailed description with reference to the accompanying drawings.

Figure 14:
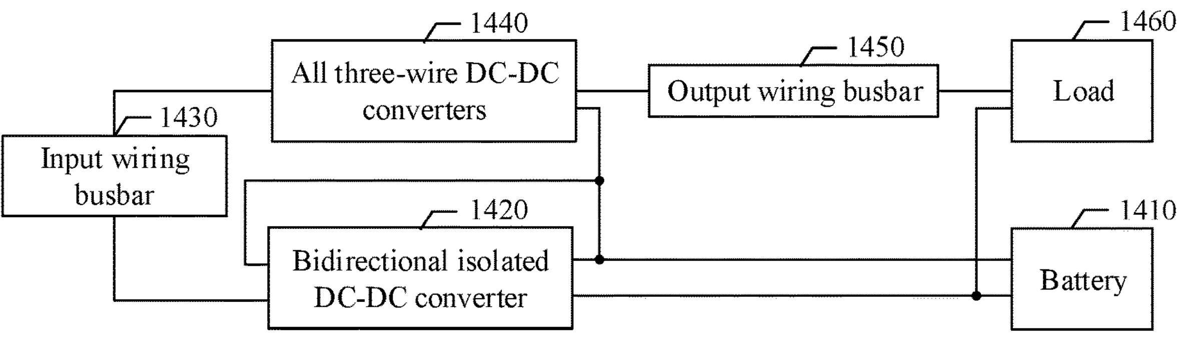
FIG. 14 is a schematic diagram of still another parallel power supply system according to an embodiment of this application.

FIG. 14 is a schematic diagram of still another parallel power supply system according to an embodiment of this application. All three-wire DC-DC converters 1440 are further configured to convert a first voltage input by an output wiring busbar 1450 into a second voltage and output the second voltage; and an input wiring busbar 1430 is configured to connect to a first terminal of a bidirectional isolated DC-DC converter 1420, and a second terminal of the bidirectional isolated DC-DC converter 1420 is configured to connect to a battery 1410.

The following separately describes power flows in two directions.

First direction: The output wiring busbar 1450 charges the battery 1410.

The output wiring busbar 1450 outputs the first voltage to the three-wire DC-DC converter 1440, and all the three-wire DC-DC converters 1440 convert the second voltage into the first voltage, and then transmit the first voltage to the battery 1410 through the input wiring busbar 1430 and the bidirectional isolated DC-DC converter 1420, to charge the battery 1410.

Second direction: The battery 1410 supplies power to a load 1440.

The battery 1410 outputs the second voltage, and transmits the second voltage to the three-wire DC-DC converter 1440 through the bidirectional isolated DC-DC converter 1420 and the input wiring busbar 1430, and the three-wire DC-DC converter 1440 converts the second voltage into the first voltage and supplies power to the load 1460.

By using the parallel power supply system provided in this embodiment of this application, the three-wire DC-DC converter can supply power to the load after being connected in series with the battery, and the output wiring busbar can charge the battery through the three-wire DC-DC converter, to implement bidirectional power supply of the parallel power supply system. Therefore, the three-wire DC-DC converter processes only a part of power of the entire system. Compared with an architecture in which the three-wire DC-DC converter processes all power of the parallel power supply system, the three-wire DC-DC converter provided in this embodiment of this application features higher efficiency, a smaller size, and lower costs.

Embodiment 6 of a Parallel Power Supply System

The following describes a case in which a plurality of batteries supply power to one load through parallel power supply.

A parallel power supply system includes at least the following two three-wire DC-DC converters: a first three-wire DC-DC converter and a second three-wire DC-DC converter. Each three-wire DC-DC converter includes a DC-DC conversion circuit, an input wiring terminal, an output wiring terminal, and a common wiring terminal. For a structure of each three-wire DC-DC converter, refer to the foregoing embodiments. Details are not described herein again.

The following provides description by using an example in which the parallel power supply system has two three-wire DC-DC converters and batteries that provide voltages are two types of batteries with different voltages.

Figure 15:
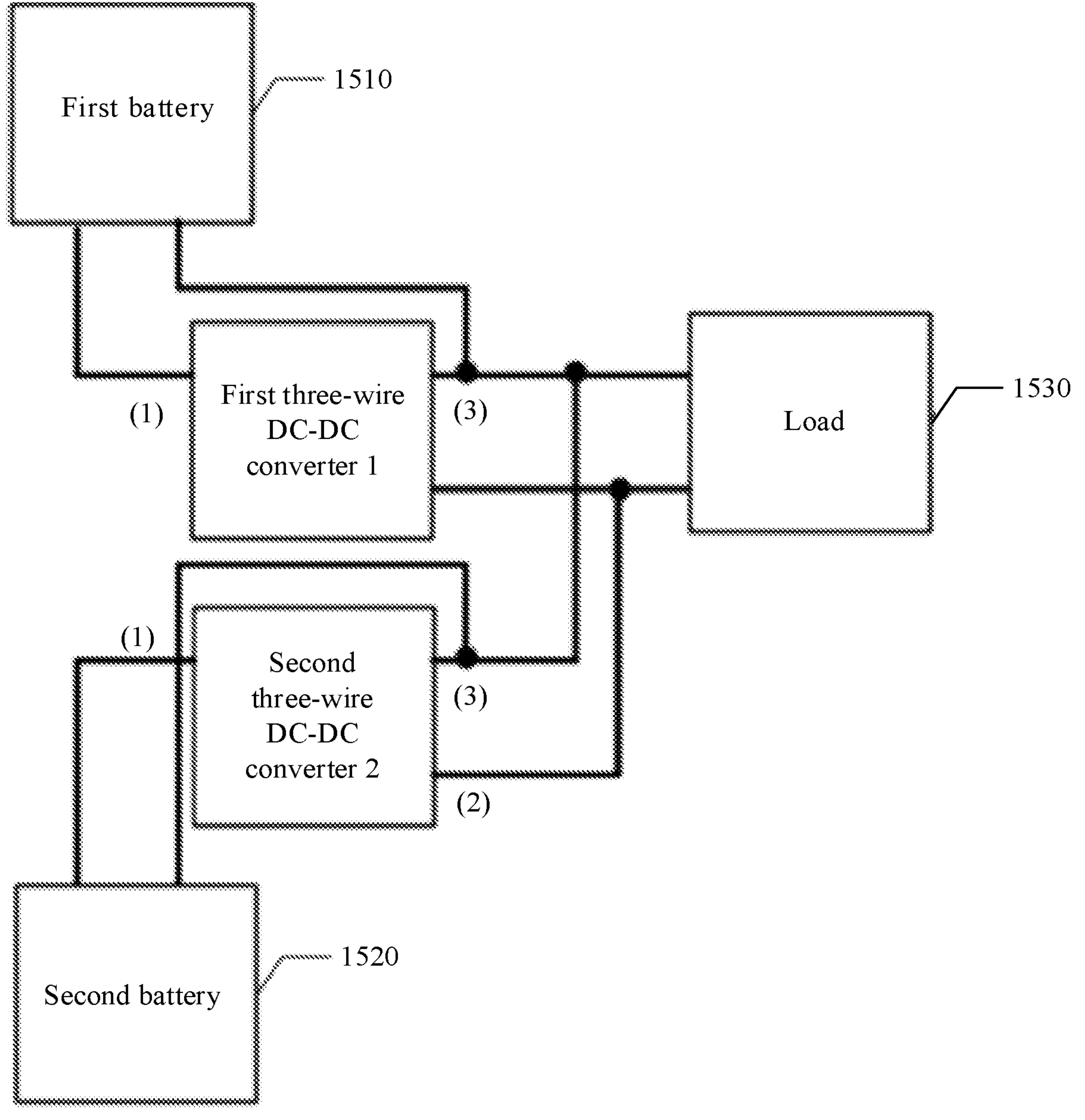
FIG. 15 is a schematic diagram of yet another parallel power supply system according to an embodiment of this application.

FIG. 15 is a schematic diagram of yet another parallel power supply system according to an embodiment of this application.

An input wiring terminal (1) of the first three-wire DC-DC converter 1 is connected to a first battery 1510, and an input wiring terminal (1) of the second three-wire DC-DC converter 2 is connected to a second battery 1520.

A common wiring terminal (3) of the first three-wire DC-DC converter 1 is connected to the first battery 1510, and a common wiring terminal (3) of the second three-wire DC-DC converter 2 is connected to the second battery 1520.

The common wiring terminal (3) of the first three-wire DC-DC converter 1 and the common wiring terminal (3) of the second three-wire DC-DC converter 2 are both connected to a load 1530.

An output wiring terminal (2) of the first three-wire DC-DC converter 1 and an output wiring terminal (2) of the second three-wire DC-DC converter 2 are both connected to the load 1530.

The first three-wire DC-DC converter 1 converts a voltage output by the first battery 1510 into a voltage required by the load 1530, and the second three-wire DC-DC converter 2 converts a voltage output by the second battery 1520 into the voltage required by the load 1530. In other words, after the first three-wire DC-DC converter 1 and the second three-wire DC-DC converter 2 convert the first battery 1510 and the second battery 1520 into a same voltage, the voltages are connected in parallel to supply power to the load.

For example, the parallel power supply system provided in this embodiment is applied to a communication device. Because voltages of lead-acid batteries in the communication device are different, to expand parallel power of a lead-acid battery pack, the parallel power supply system provided in this embodiment may be used to separately adjust the voltages of the lead-acid batteries and then output the voltages in parallel.

A quantity of first three-wire DC-DC converters or second three-wire DC-DC converters is not limited in this embodiment of this application. For example, a plurality of first three-wire DC-DC converters may be cascaded to convert a voltage output by the first battery 1510 into a voltage required by the load 1530.

When the first battery and the second battery cooperatively work, a power supply manner is not limited in this embodiment of this application. For example, the manner may be set to current-equalized power supply or balanced power supply.

The current-equalized power supply means that the parallel power supply system controls output currents of all three-wire DC-DC converters to be equal. For example, the parallel power supply system controls the output current of the first three-wire DC-DC converter 1 to be equal to the output current of the second three-wire DC-DC converter 2.

The balanced power supply means that the parallel power supply system separately controls an output current of each three-wire DC-DC converter. For example, when a discharge capability of the first battery 1510 is greater than a discharge capability of the second battery 1520, the parallel power supply system controls the output current of the first three-wire DC-DC converter 1 to be relatively large and the output current of the second three-wire DC-DC converter to be relatively small, so that the discharge capabilities of the first battery 1510 and the second battery 1520 are fully utilized.

The parallel power supply system provided in this embodiment of this application is applied to a scenario in which a plurality of batteries of different levels supply power to a same load, for example, a scenario of a lead-acid battery pack. By using one three-wire DC-DC converter or cascading a plurality of three-wire DC-DC converters, voltages output by the batteries of different voltage levels are separately converted into a voltage required by the load, thereby implementing power expansion of the batteries of different levels.

Embodiment 7 of a Parallel Power Supply System

Embodiment 6 of a parallel power supply system mainly describes a case in which a plurality of batteries supply power to one load through the parallel power supply system. The following describes a case in which one battery supplies power to a plurality of loads through a parallel power supply system.

The parallel power supply system includes at least the following two three-wire DC-DC converters: a first three-wire DC-DC converter and a second three-wire DC-DC converter. Each three-wire DC-DC converter includes a DC-DC conversion circuit, an input wiring terminal, an output wiring terminal, and a common wiring terminal. For a structure of each three-wire DC-DC converter, refer to the foregoing embodiments. Details are not described herein again.

The following provides description by using an example in which the parallel power supply system has two three-wire DC-DC converters and loads that need to be supplied with power are two loads requiring different voltages.

Figure 16:
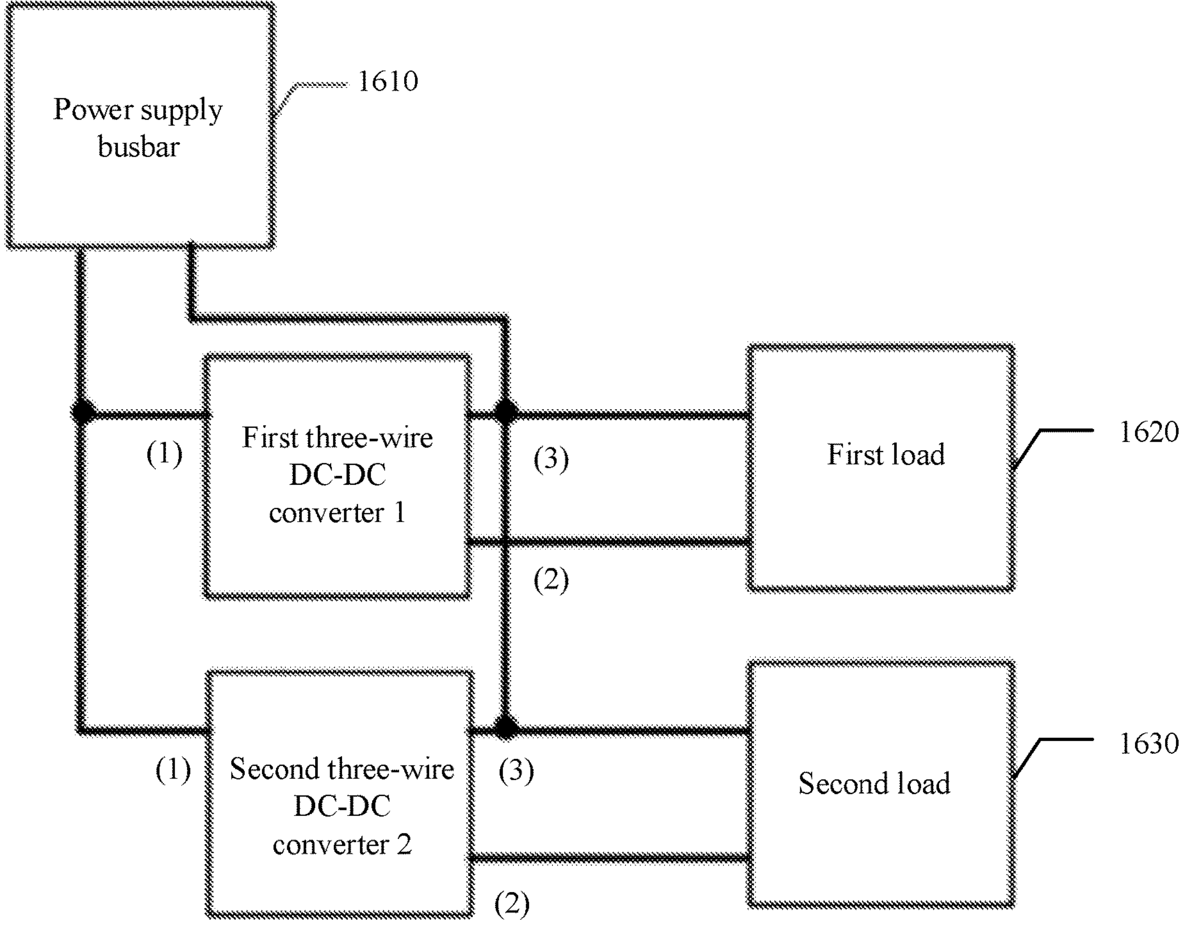
FIG. 16 is a schematic diagram of another parallel power supply system according to an embodiment of this application.

FIG. 16 is a schematic diagram of another parallel power supply system according to an embodiment of this application.

An input wiring terminal (1) of the first three-wire DC-DC converter 1 and an input wiring terminal (1) of the second three-wire DC-DC converter 2 are both connected to a power supply busbar 1610 of a direct current power supply.

A common wiring terminal (3) of the first three-wire DC-DC converter 1 and a common wiring terminal (3) of the second three-wire DC-DC converter 2 are both connected to the power supply busbar 1610.

The common wiring terminal (3) of the first three-wire DC-DC converter 1 is connected to a first load 1620, and the common wiring terminal (3) of the second three-wire DC-DC converter 2 is connected to a second load 1630.

An output wiring terminal (2) of the first three-wire DC-DC converter 1 is connected to the first load 1620, and an output wiring terminal (2) of the second three-wire DC-DC converter 2 is connected to the second load 1630.

The first three-wire DC-DC converter 1 converts a voltage output by the power supply busbar 1610 into a voltage required by the first load 1620 to supply power to the first load 1620. Similarly, the second three-wire DC-DC converter 2 converts the voltage output by the power supply busbar 1610 into a voltage required by the second load 1630 to supply power to the second load 1630.

A quantity of first three-wire DC-DC converters or second three-wire DC-DC converters is not limited in this embodiment of this application. For example, a plurality of first three-wire DC-DC converters may be cascaded to convert the voltage output by the power supply busbar 1610 into the voltage required by the first load 1620.

The parallel power supply system provided in this embodiment of this application is applied to a scenario in which different loads have different requirements on power supply voltage standards. A parallel power supply system that includes at least two three-wire DC-DC converters separately converts a same power supply busbar into different voltage standards, to meet different requirements of different loads on power supply voltage standards.

It should be understood that, in this application, "at least one piece (item)" means one or more, and "a plurality of" means two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" usually indicates an "or" relationship between the associated objects. "At least one of the following items (pieces)" or a similar expression thereof indicates any combination of these items, including a single item (piece) or any combination of a plurality of items (pieces). For example, at least one item (piece) of a, b, or c may represent: a, b, c, "a and b", "a and c", "b and c", or "a, b, and c", where a, b, and c may be singular or plural.

The foregoing descriptions are merely examples of embodiments of this application, and are not intended to limit this application in any form. Although the example embodiments of this application are disclosed above, the embodiments are not intended to limit this application. By using the method and the technical content disclosed above, any person of ordinary skill in the art can make a plurality of changes and modifications on the technical solutions of this application, or amend the technical solutions thereof to be embodiments with equal effects through equivalent variations without departing from the protection scope of the technical solutions of this application. Therefore, any simple amendments, equivalent variations, and modifications made on the foregoing embodiments according to the technical essence of this application without departing from the content of the technical solutions of this application shall fall within the protection scope of the technical solutions of this application.

What is claimed is:

1. A parallel power supply system, comprising:
a common wiring busbar;
an input wiring busbar;
an output wiring busbar; and
at least two three-wire DC-DC converters, each DC-DC converter of the at least two three-wire DC-DC converters comprising:
a DC-DC conversion circuit;
an input wiring terminal;
an output wiring terminal; and
a common wiring terminal;
input wiring terminals of the at least two three-wire DC-DC converters are connected in parallel to the input wiring busbar, output wiring terminals of the at least two three-wire DC-DC converters are connected in parallel to the output wiring busbar, and common wiring terminals of the at least two three-wire DC-DC converters are connected in parallel to the common wiring busbar;
the input wiring busbar is configured to connect to a first power input terminal of a first direct current power supply;
the output wiring busbar is configured to connect to a first power terminal of a load;
the common wiring busbar is configured to connect to a second power terminal of the load and the common wiring busbar is configured to connect to a second power input terminal of the first direct current power supply;
the at least two three-wire DC-DC converters convert a voltage of the first direct current power supply into a voltage required by the load, the at least two three-wire DC-DC converters output the voltage and output at least two currents at the output wiring terminals of the at least two three-wire DC-DC converters, the at least two output currents being consistent;
a first current detection circuit coupled to an output wiring terminal of a first three-wire DC-DC converter of the at least two three-wire DC-DC converters, the first current detection circuit detecting a first current from the first three-wire DC-DC converter and transmitting the first current to a controller;
a second current detection circuit coupled to an output wiring terminal of a second three-wire DC-DC converter of the at least two three-wire DC-DC converters, the second current detection circuit detecting a second current from the second three-wire DC-DC converter and transmitting the second current to the controller; and
the controller in communication with the first current detection circuit and the second current detection circuit, the controller being configured to:
control an output voltage of the first three-wire DC-DC converter to enable the first current to be consistent with a preset current; and
control an output voltage of the second three-wire DC-DC converter to enable the second current to be consistent with the preset current.

2. The parallel power supply system according to claim 1, further comprising the first direct current power supply and a second direct current power supply, wherein voltages of the first direct current power supply and the second direct current power supply are different, the output wiring busbar is connected to a first power input terminal of the second direct current power supply, and the first power input terminal of the second direct current power supply is connected to the load;

the common wiring busbar is connected to the second power input terminal of the first direct current power supply, and the common wiring busbar is connected to a second power input terminal of the second direct current power supply; and each three-wire DC-DC converter of the at least two three-wire DC-DC converters is configured to convert a voltage at the first power input terminal of the first direct current power supply to be consistent with a voltage at the first power input terminal of the second direct current power supply.

3. The parallel power supply system according to claim 2, wherein the controller is further configured to control the at least two three-wire DC-DC converters to transmit all remaining electric energy of the first direct current power supply to the load after conversion.

4. The parallel power supply system according to claim 2, wherein the controller is further configured to: when the second direct current power supply is insufficient to meet an electric energy requirement of the load, control the at least two three-wire DC-DC converters to transmit remaining electric energy of the first direct current power supply to the load after conversion.

5. The parallel power supply system according to claim 3, wherein an output current of the output wiring busbar is consistent with an output current of the second direct current power supply.

6. The parallel power supply system according to claim 1, wherein the DC-DC conversion circuit is at least one of the following types:

an H-bridge circuit, a Buck circuit, a Boost circuit, a BuckBoost circuit, a Cuk circuit, a Sepic circuit, or a Zeta circuit.

7. The parallel power supply system according to claim 6, wherein when the DC-DC conversion circuit is an H-bridge circuit, the DC-DC conversion circuit comprises a first switching transistor, a second switching transistor, a third switching transistor, a fourth switching transistor, an inductor, a first capacitor, and a second capacitor;

a first terminal of the first switching transistor is connected to the input wiring terminal, and a second terminal of the first switching transistor is connected to a first terminal of the second switching transistor;

a second terminal of the second switching transistor is connected to the common wiring terminal;

a first terminal of the third switching transistor is connected to the output wiring terminal, a second terminal of the third switching transistor is connected to a first terminal of the fourth switching transistor, and a second terminal of the fourth switching transistor is connected to the common wiring terminal;

the first capacitor is connected between the input wiring terminal and the common wiring terminal, and the second capacitor is connected between the common wiring terminal and the output wiring terminal; and the inductor is connected between the second terminal of the first switching transistor and the second terminal of the third switching transistor.

8. The parallel power supply system according to claim 6, wherein when the DC-DC conversion circuit is a Buck circuit, the DC-DC conversion circuit comprises a switching transistor, a diode, an inductor, and a capacitor;

a first terminal of the switching transistor is connected to the input wiring terminal, and a second terminal of the switching transistor is connected to the output wiring terminal through the inductor;

the second terminal of the switching transistor is connected to a cathode of the diode, and an anode of the diode is connected to the common wiring terminal; and the capacitor is connected between the output wiring terminal and the common wiring terminal.

9. The parallel power supply system according to claim 6, wherein when the DC-DC conversion circuit is a Boost circuit, the DC-DC conversion circuit comprises a switching transistor, a diode, an inductor, and a capacitor;

a first terminal of the inductor is connected to the input wiring terminal, and a second terminal of the inductor is connected to the common wiring terminal through the switching transistor;

the second terminal of the inductor is connected to an anode of the diode, and a cathode of the diode is connected to the output wiring terminal; and the capacitor is connected between the output wiring terminal and the common wiring terminal.

10. The parallel power supply system according to claim 6, wherein when the DC-DC conversion circuit is a Buck-Boost circuit, the DC-DC conversion circuit comprises a switching transistor, a diode, an inductor, and a capacitor;

a first terminal of the switching transistor is connected to the input wiring terminal, and a second terminal of the switching transistor is connected to the common wiring terminal through the inductor;

the second terminal of the switching transistor is connected to a cathode of the diode, and an anode of the diode is connected to the output wiring terminal; and the capacitor is connected between the output wiring terminal and the common wiring terminal.

11. The parallel power supply system according to claim 6, wherein when the DC-DC conversion circuit is a Cuk circuit, the DC-DC conversion circuit comprises a first inductor, a second inductor, a first capacitor, a second capacitor, a switching transistor, and a diode;

a first terminal of the first inductor is connected to the input wiring terminal, and a second terminal of the first inductor is connected to the common wiring terminal through the switching transistor;

the second terminal of the first inductor is connected to a first terminal of the first capacitor, and a second terminal of the first capacitor is connected to the output wiring terminal through the second inductor;

the second terminal of the first capacitor is connected to an anode of the diode, and a cathode of the diode is connected to the common wiring terminal; and the second capacitor is connected between the output wiring terminal and the common wiring terminal.

12. The parallel power supply system according to claim 6, wherein when the DC-DC conversion circuit is a Sepic circuit, the DC-DC conversion circuit comprises a first inductor, a second inductor, a first capacitor, a second capacitor, a switching transistor, and a diode;

a first terminal of the first inductor is connected to the input wiring terminal, and a second terminal of the first inductor is connected to the common wiring terminal through the switching transistor;

the second terminal of the first inductor is connected to a first terminal of the first capacitor, and a second terminal of the first capacitor is connected to the common wiring terminal through the second inductor;

the second terminal of the first capacitor is connected to an anode of the diode, and a cathode of the diode is connected to the output wiring terminal; and the second capacitor is connected between the output wiring terminal and the common wiring terminal.

13. The parallel power supply system according to claim 6, wherein when the DC-DC conversion circuit is a Zeta circuit, the DC-DC conversion circuit comprises a first inductor, a second inductor, a first capacitor, a second capacitor, a switching transistor, and a diode;

a first terminal of the switching transistor is connected to the input wiring terminal, and a second terminal of the switching transistor is connected to the common wiring terminal through the first inductor;

the second terminal of the switching transistor is connected to a first terminal of the first capacitor, and a second terminal of the first capacitor is connected to the output wiring terminal through the second inductor;

the second terminal of the first capacitor is connected to a cathode of the diode, and an anode of the diode is connected to the common wiring terminal; and the second capacitor is connected between the output wiring terminal and the common wiring terminal.

14. The parallel power supply system according to claim 2, wherein the voltage of the first direct current power supply is negative 53.5 volts, and the voltage of the second direct current power supply is negative 57 volts.

15. The parallel power supply system according to claim 1, wherein the at least two three-wire DC-DC converters are further configured to convert a first voltage input by the output wiring busbar into a second voltage and output the second voltage; and the input wiring busbar is configured to connect to a first terminal of a bidirectional isolated DC-DC converter, and a second terminal of the bidirectional isolated DC-DC converter is configured to connect to a battery.

16. A parallel power supply system, comprising:

a first three-wire DC-DC converter; and a second three-wire DC-DC converter;

each of the first and second three-wire DC-DC converters comprise:

a DC-DC conversion circuit;

an input wiring terminal;

an output wiring terminal; and a common wiring terminal;

the input wiring terminal of the first three-wire DC-DC converter is configured to connect to a first battery, and the input wiring terminal of the second three-wire DC-DC converter is configured to connect to a second battery;

the common wiring terminal of the first three-wire DC-DC converter is configured to connect to the first battery, and the common wiring terminal of the second three-wire DC-DC converter is configured to connect to the second battery;

the common wiring terminal of the first three-wire DC-DC converter and the common wiring terminal of the second three-wire DC-DC converter are configured to connect to a load;

the output wiring terminal of the first three-wire DC-DC converter and the output wiring terminal of the second three-wire DC-DC converter are configured to connect to the load;

a first current detection circuit coupled to an output wiring terminal of the first three-wire DC-DC converter, the first current detection circuit detecting a first current from the first three-wire DC-DC converter and transmitting the first current to a controller;

a second current detection circuit coupled to an output wiring terminal of the second three-wire DC-DC converter, the second current detection circuit detecting a second current from the second three-wire DC-DC converter and transmitting the second current to the controller; and the controller in communication with the first current detection circuit and the second current detection circuit, the controller being configured to:

control an output voltage of the first three-wire DC-DC converter to enable the first current to be consistent with a preset current; and control an output voltage of the second three-wire DC-DC converter to enable the second current to be consistent with the preset current.

* * * * *